Feb. 8, 1927.
A. H. CANDEE ET AL
1,616,439
METHOD OF AND MACHINE FOR PRODUCING GEARS
Filed Nov. 23, 1925     32 Sheets-Sheet 1
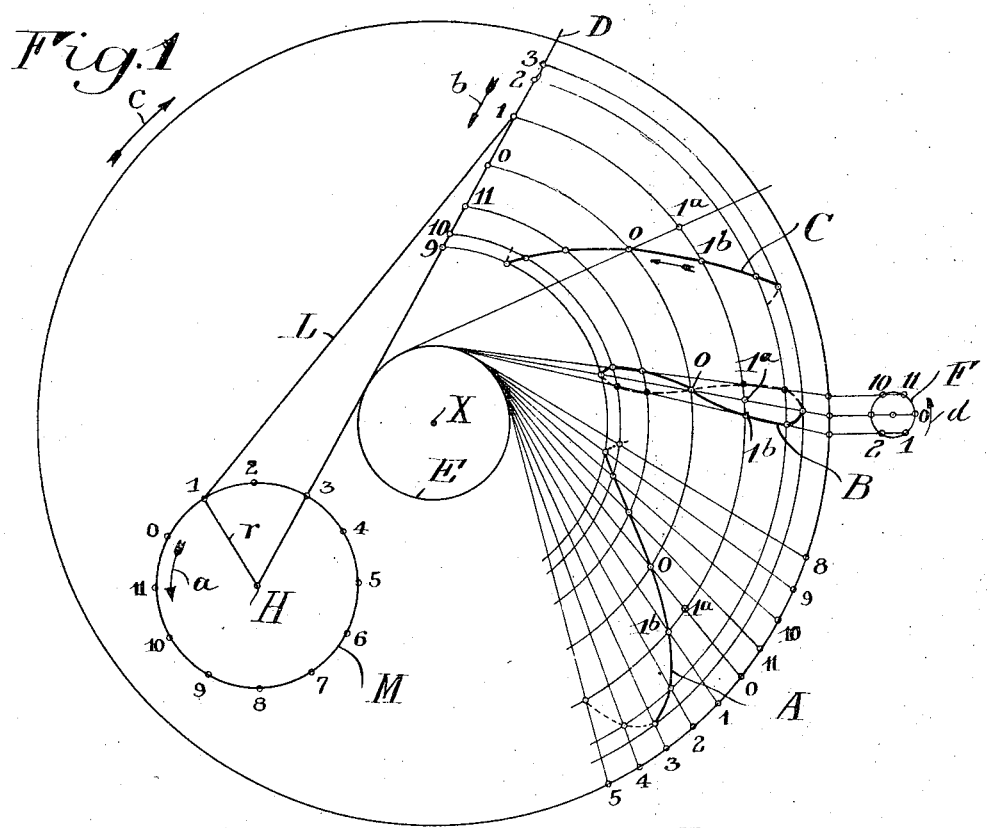
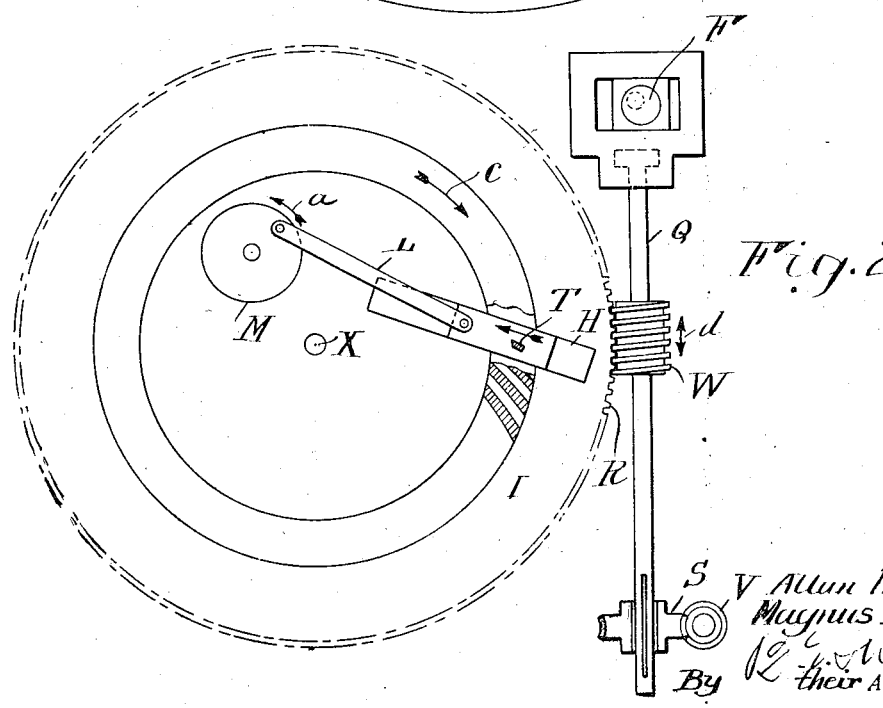
INVENTORS
V Allan H. Candee
Magnus H. Johanson
By their ATTORNEY Feb. 8, 1927.
A. H. CANDEE ET AL
1,616,439
METHOD OF AND MACHINE FOR PRODUCING GEARS
Filed Nov. 23, 1925  32 Sheets-Sheet 2
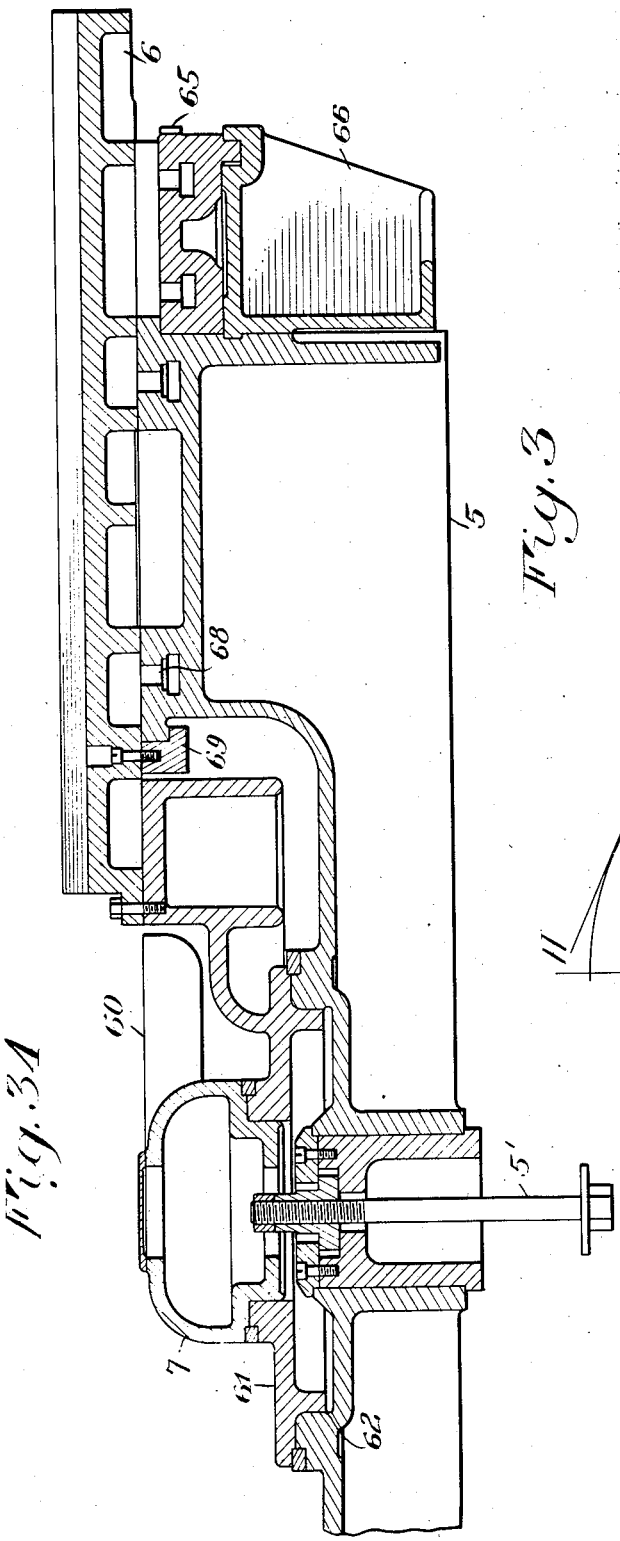
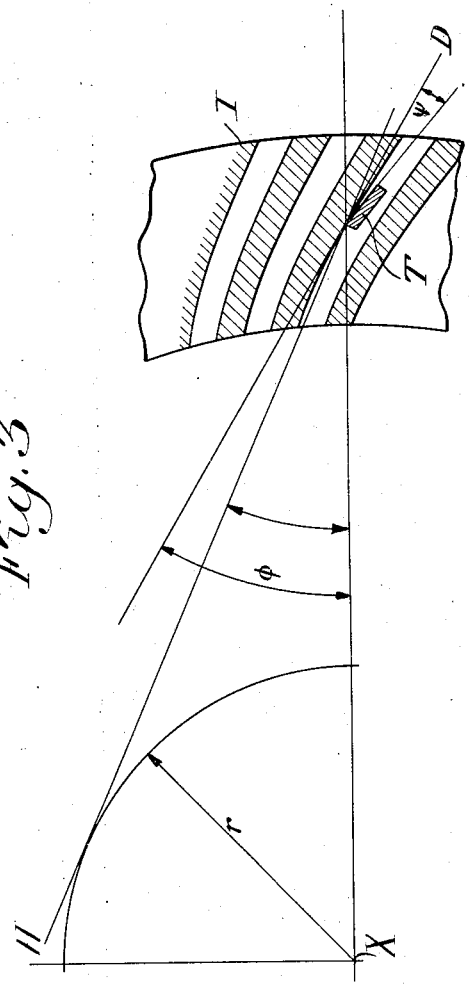
INVENTORS
Allan H. Candee
Magnus H. Johanson
BY
their ATTORNEY Feb. 8, 1927.

A. H. CANDEE ET AL 1,616,439

METHOD OF AND MACHINE FOR PRODUCING GEARS

Filed Nov. 23, 1925   32 Sheets-Sheet 3

Inventors
Allan H. Candee
Magnus H. Johanson
By
their Attorney

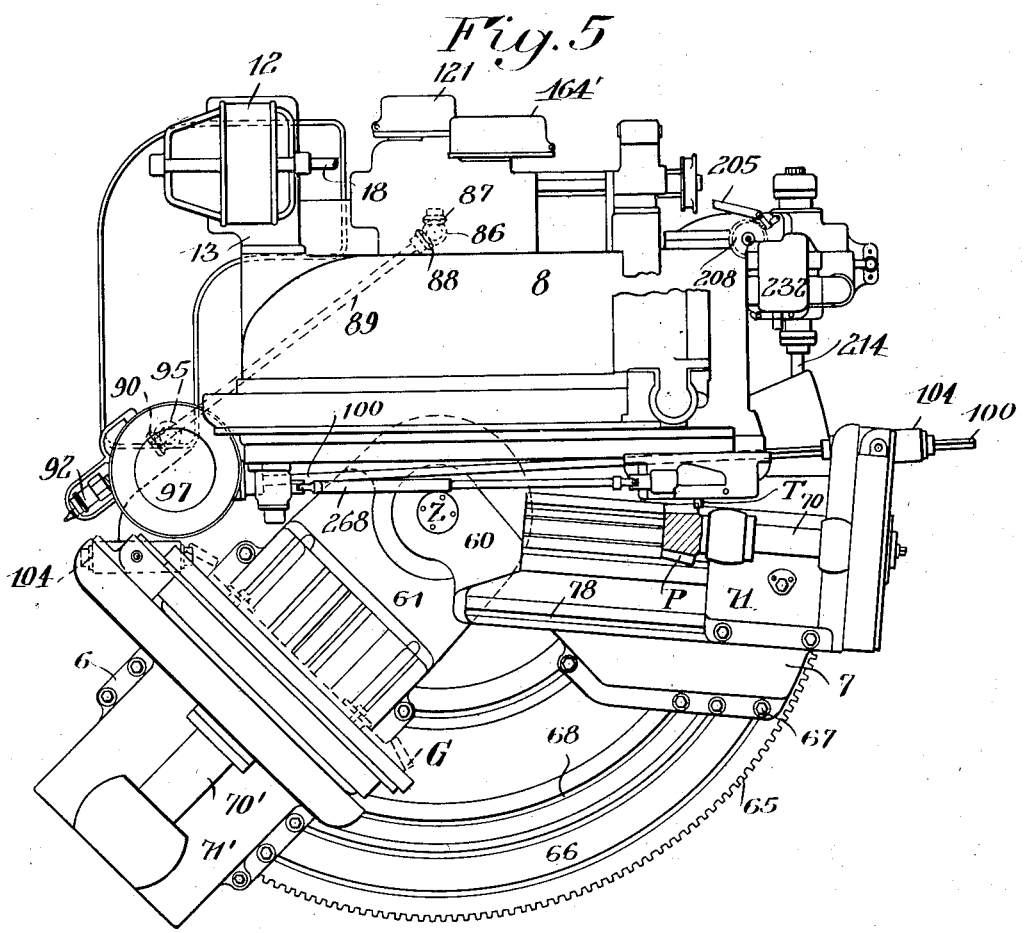
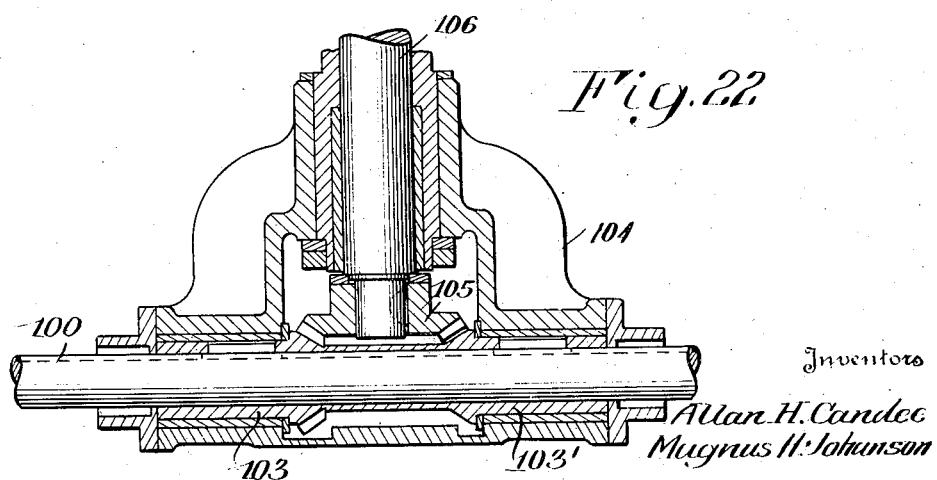

Feb. 8, 1927.
A. H. CANDEE ET AL
1,616,439
METHOD OF AND MACHINE FOR PRODUCING GEARS
Filed Nov. 23, 1925 32 Sheets-Sheet 7
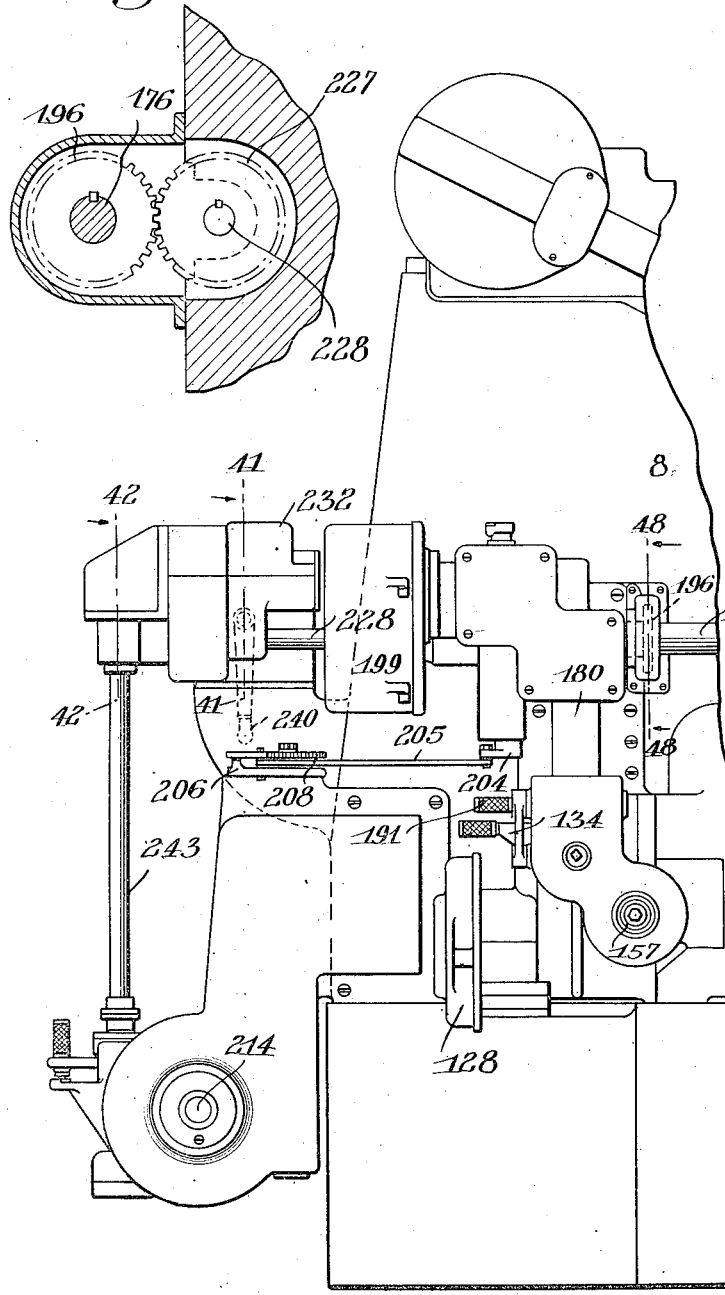
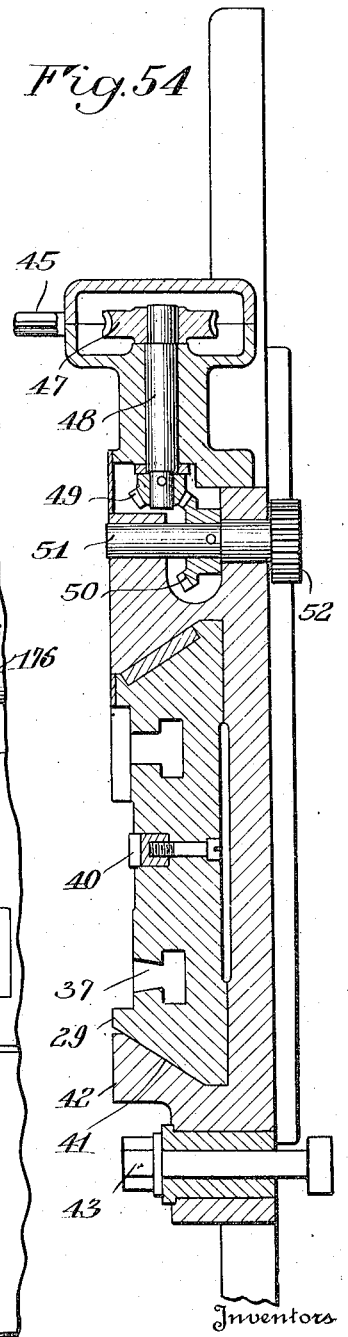
Inventors
Allan H. Candee
Magnus H. Johanson
their Attorney

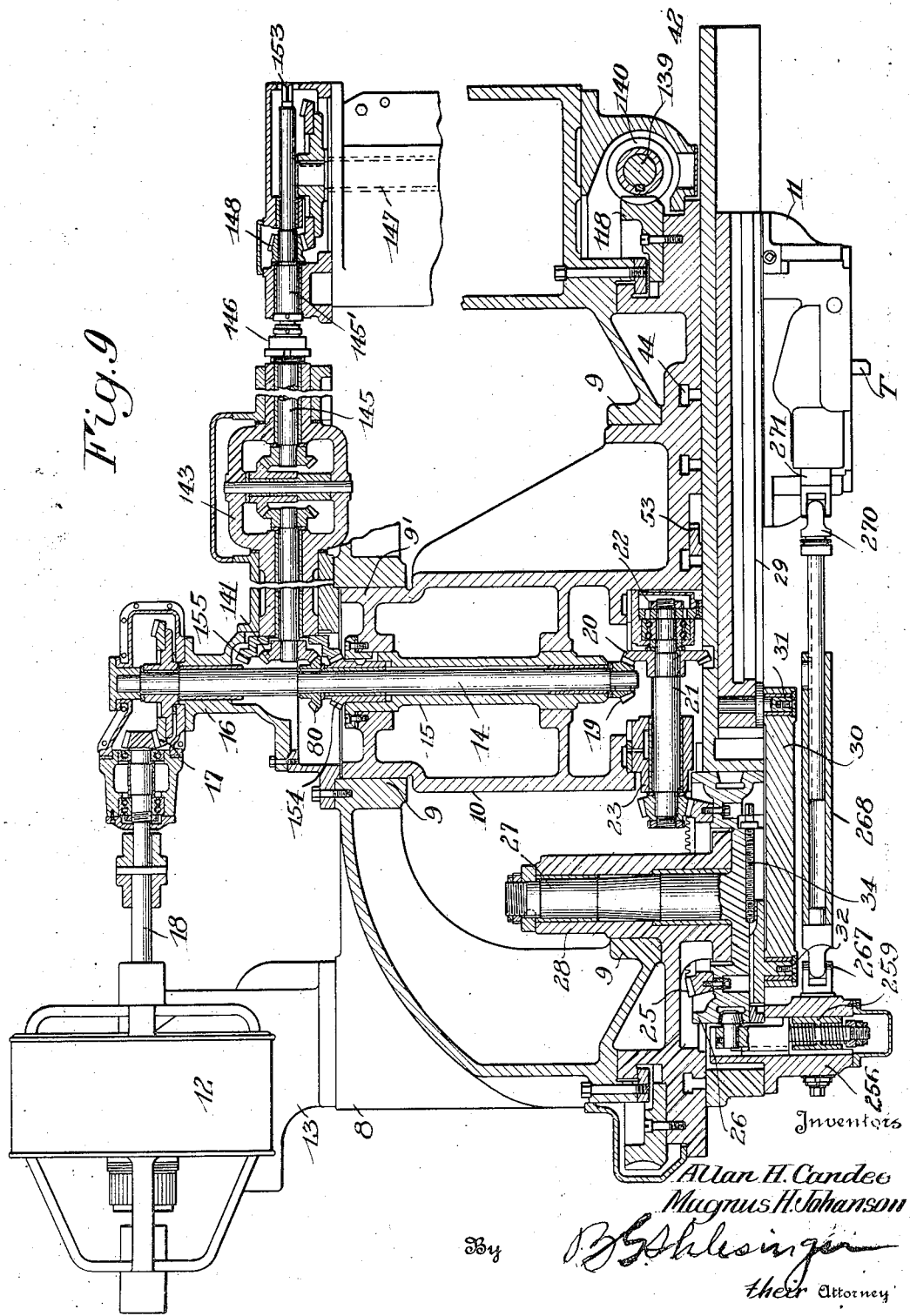

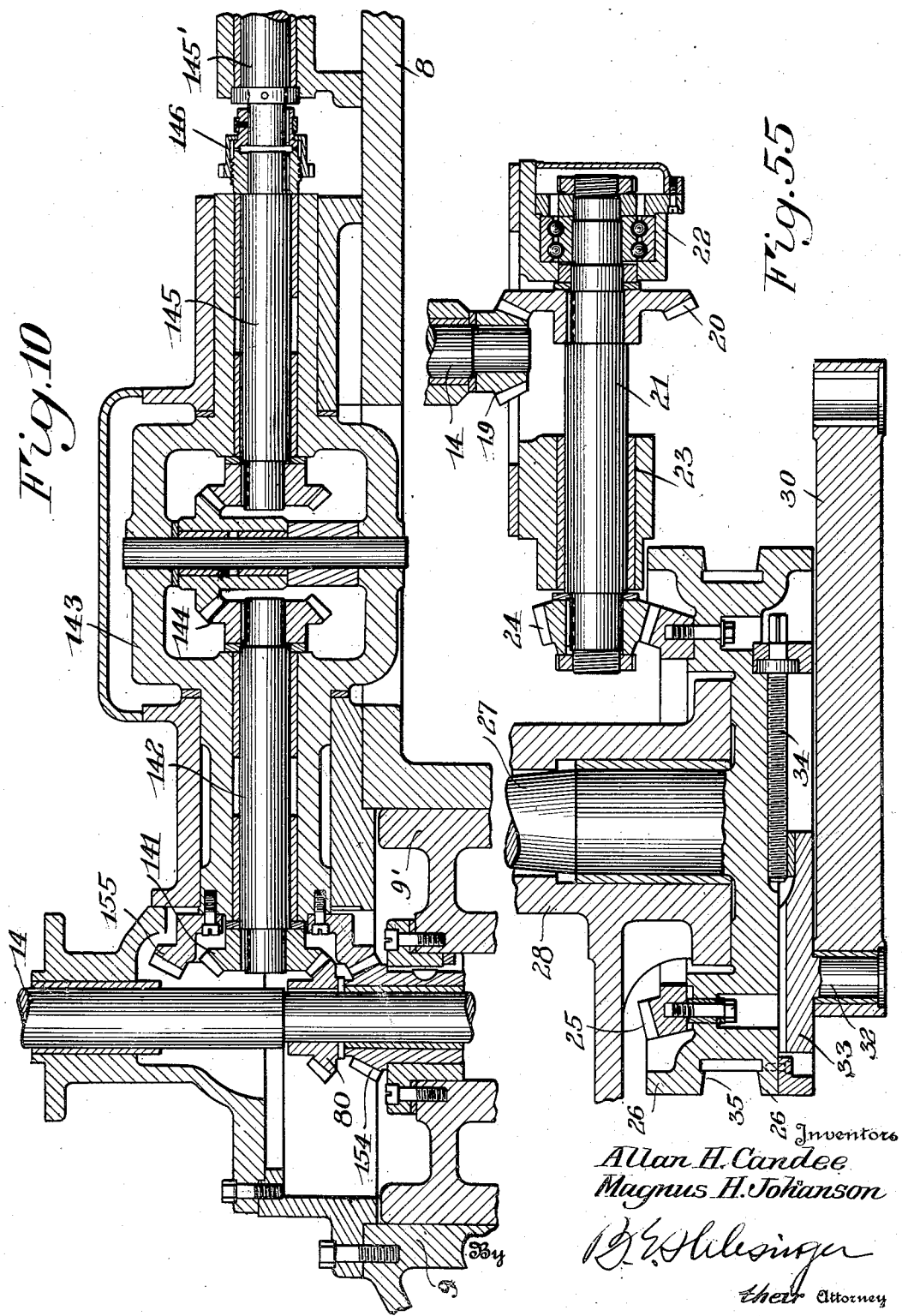

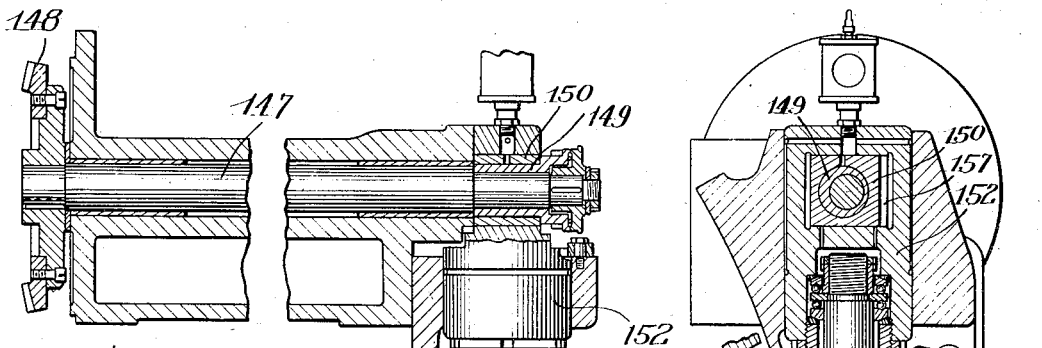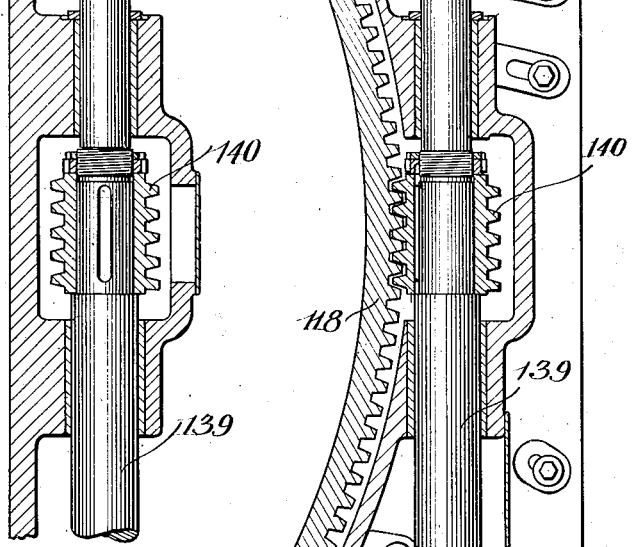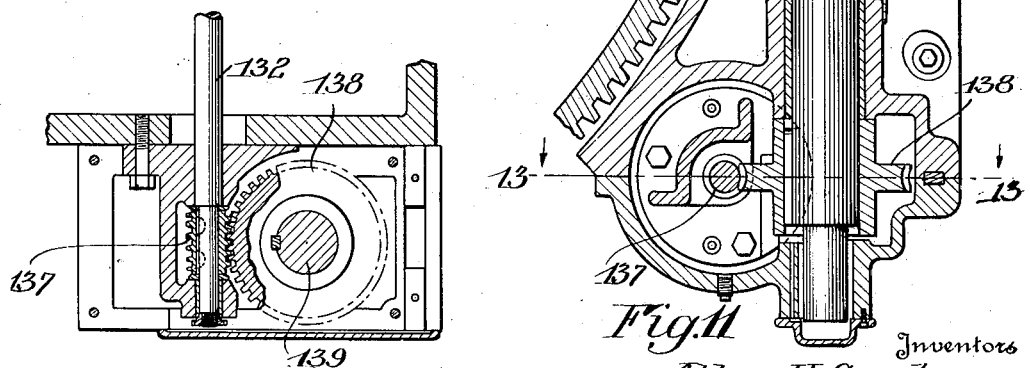

Feb. 8, 1927. 1,616,439
A. H. CANDEE ET AL
METHOD OF AND MACHINE FOR PRODUCING GEARS
Filed Nov. 23, 1925 32 Sheets-Sheet 11

Inventors
Allan H. Candee
Magnus H. Johanson

By
their Attorney

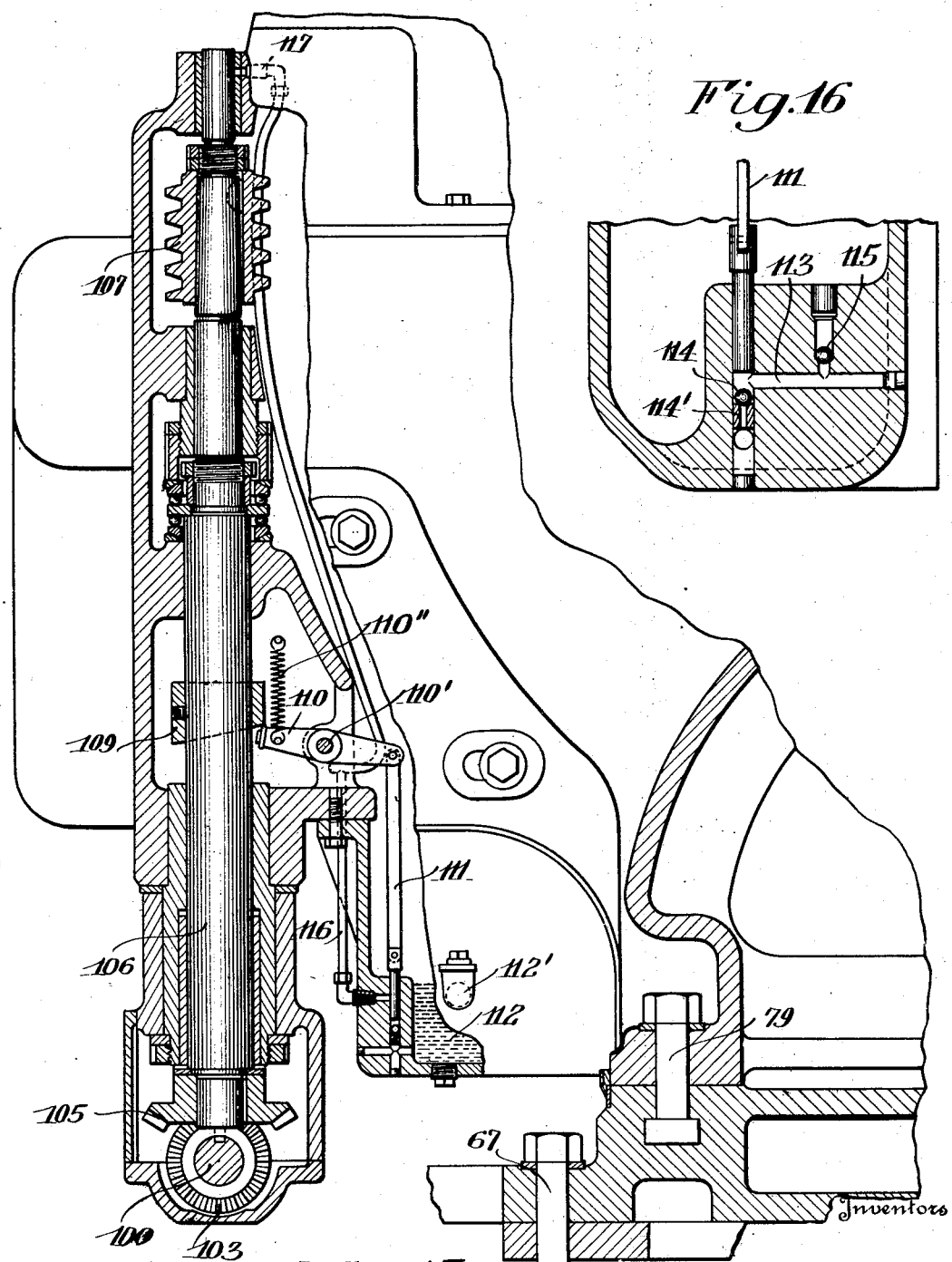

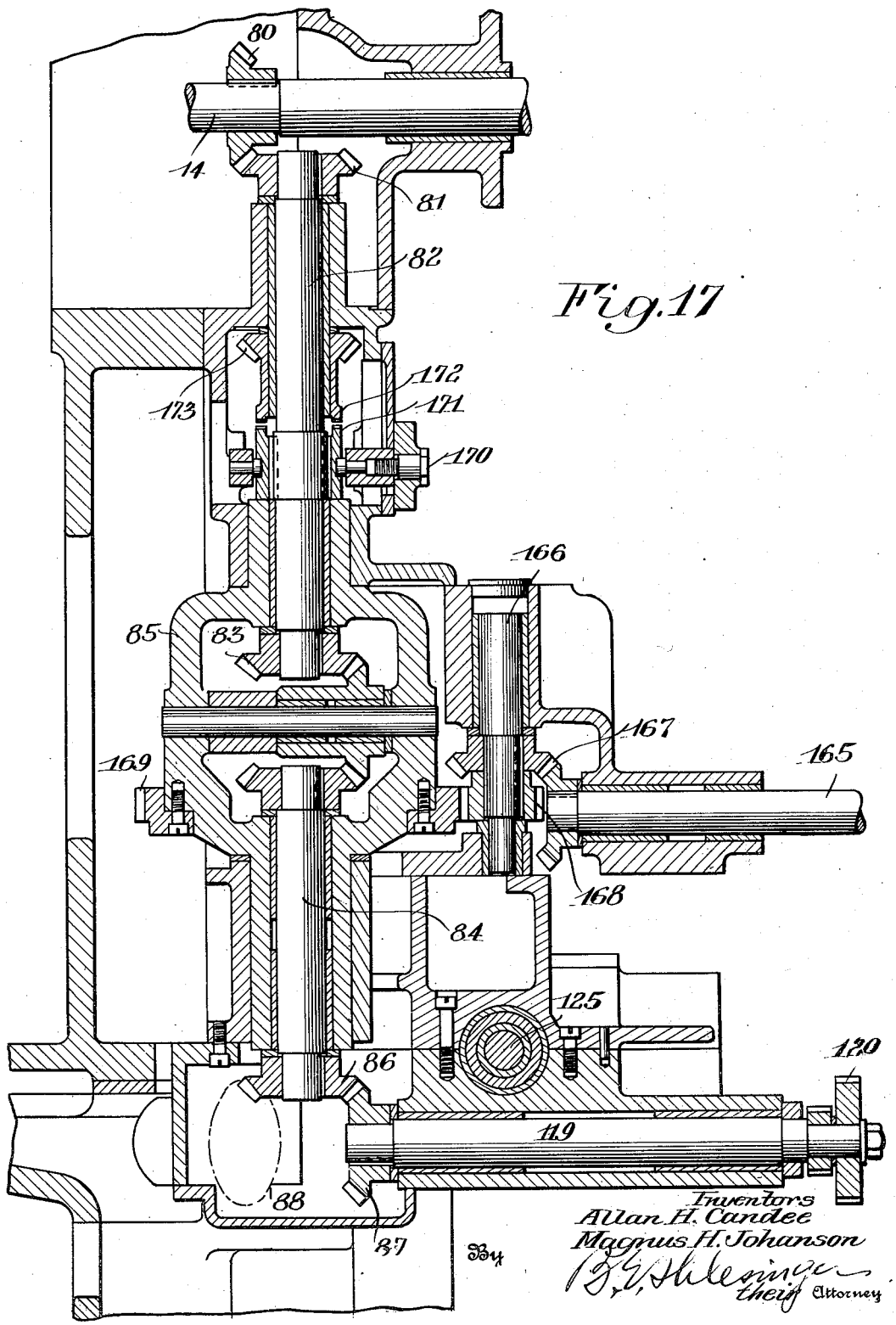

Feb. 8, 1927.  
A. H. CANDEE ET AL  
1,616,439  
METHOD OF AND MACHINE FOR PRODUCING GEARS  
Filed Nov. 23, 1925   32 Sheets-Sheet 14
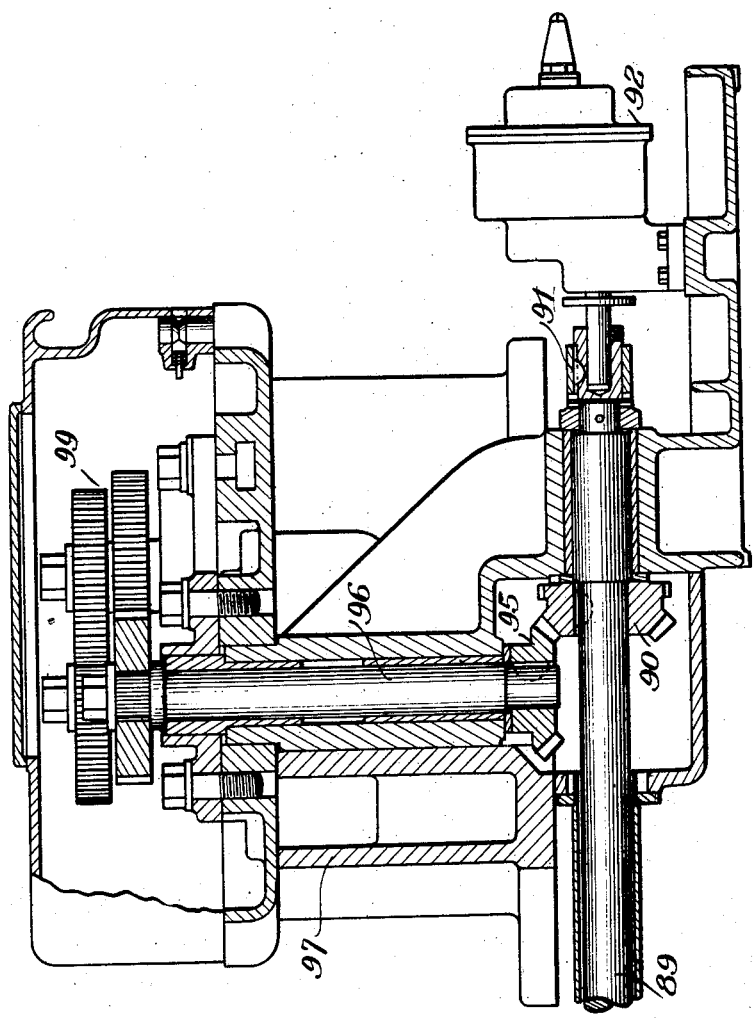
Fig. 16
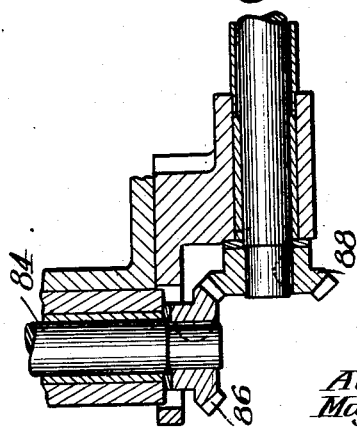
INVENTORS  
Allan H. Candee  
Magnus H. Johanson  
By  
their ATTORNEY Feb. 8, 1927. 1,616,439
A. H. CANDEE ET AL
METHOD OF AND MACHINE FOR PRODUCING GEARS
Filed Nov. 23, 1925  32 Sheets-Sheet 15

INVENTORS
Allan H. Candee
Magnus H. Johanson
BY
their ATTORNEY

Feb. 8, 1927. 1,616,439
A. H. CANDEE ET AL
METHOD OF AND MACHINE FOR PRODUCING GEARS
Filed Nov. 23, 1925 32 Sheets-Sheet 16
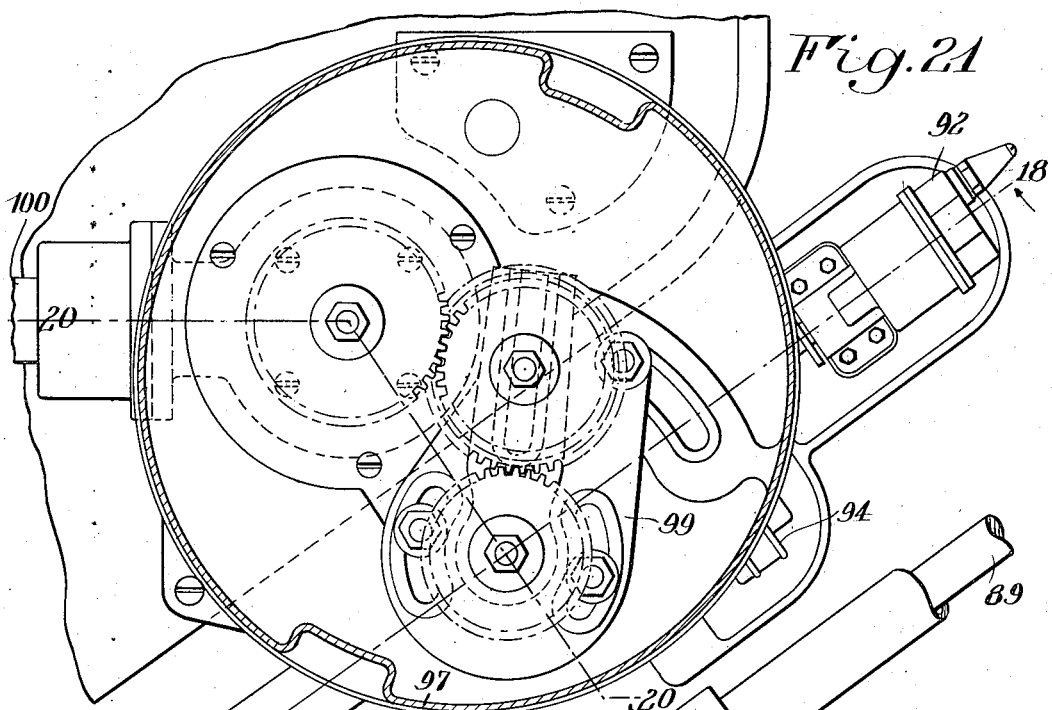
Fig. 21
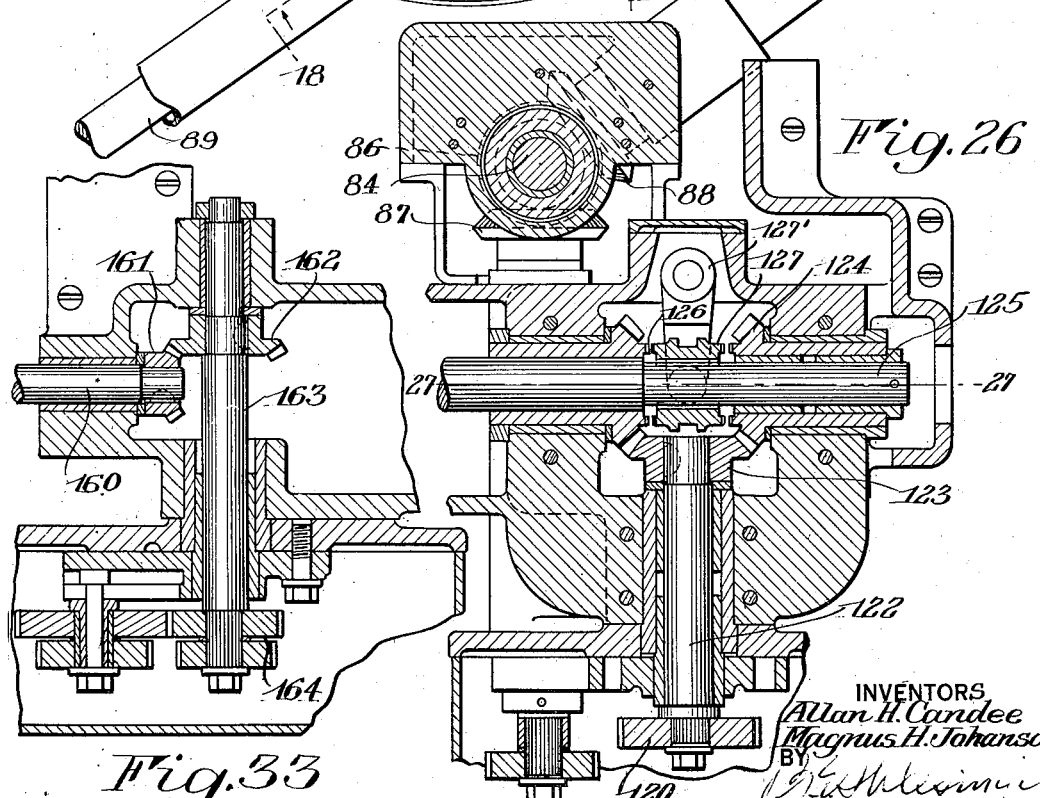
Fig. 26
Fig. 33
INVENTORS
Allan H. Candee
Magnus H. Johanson
BY
their ATTORNEY

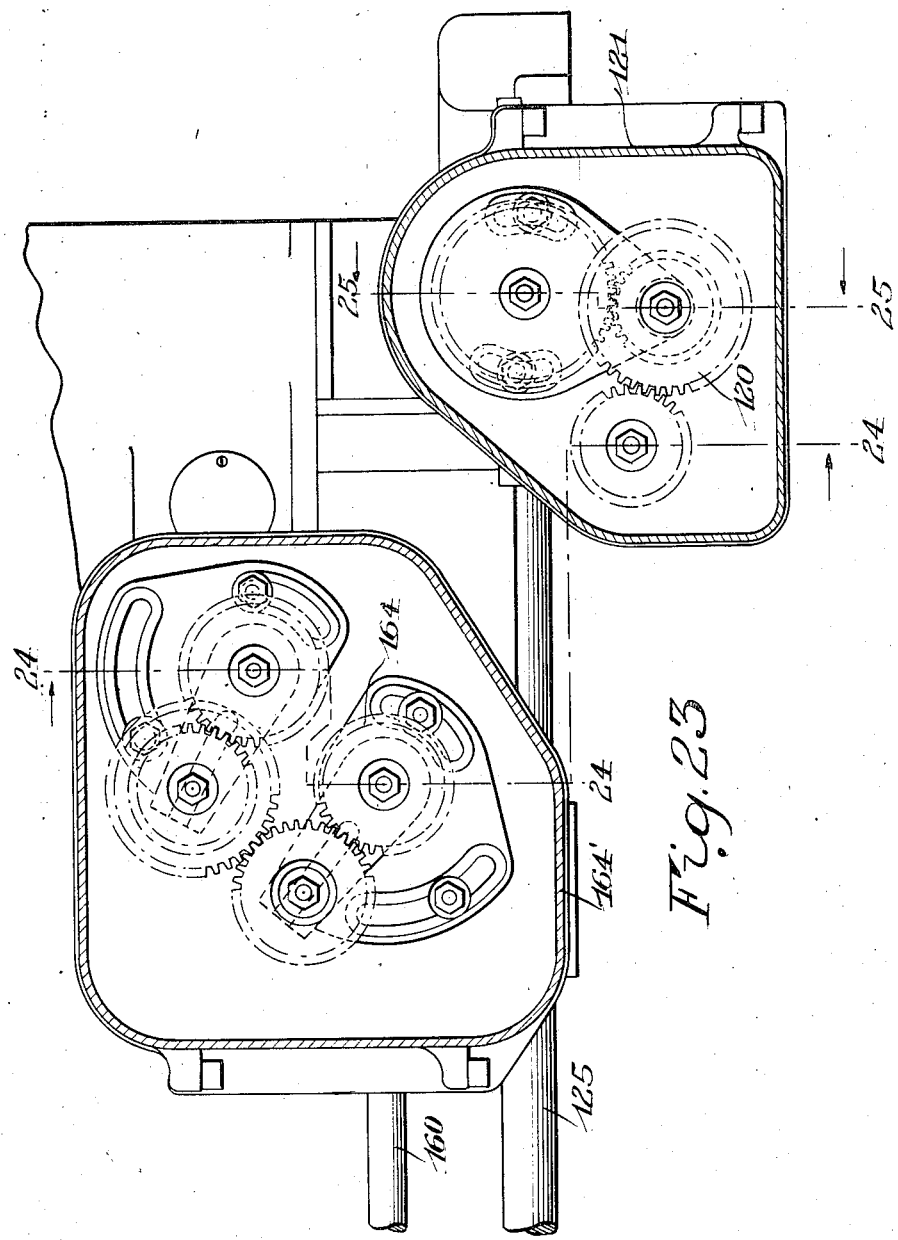

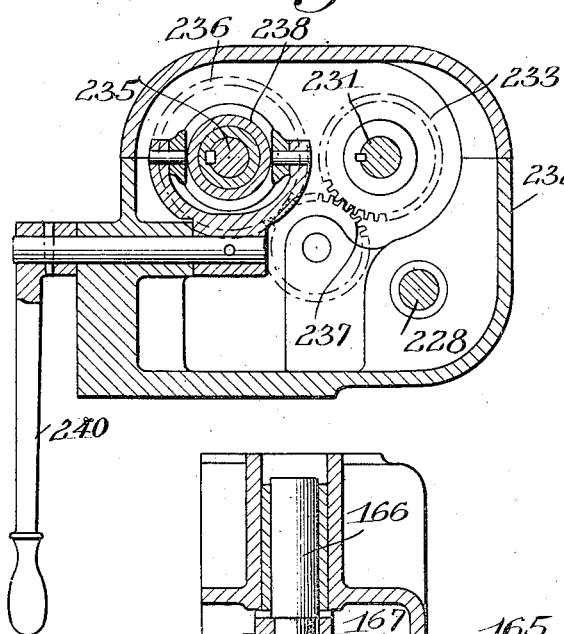
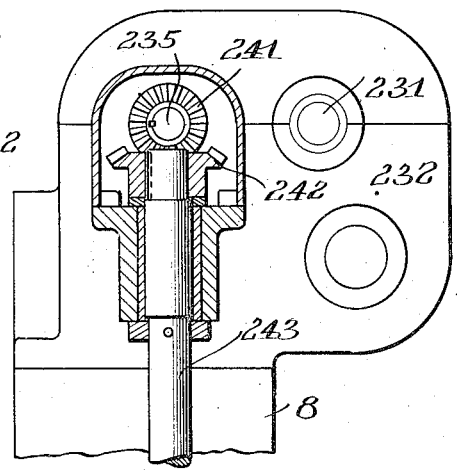
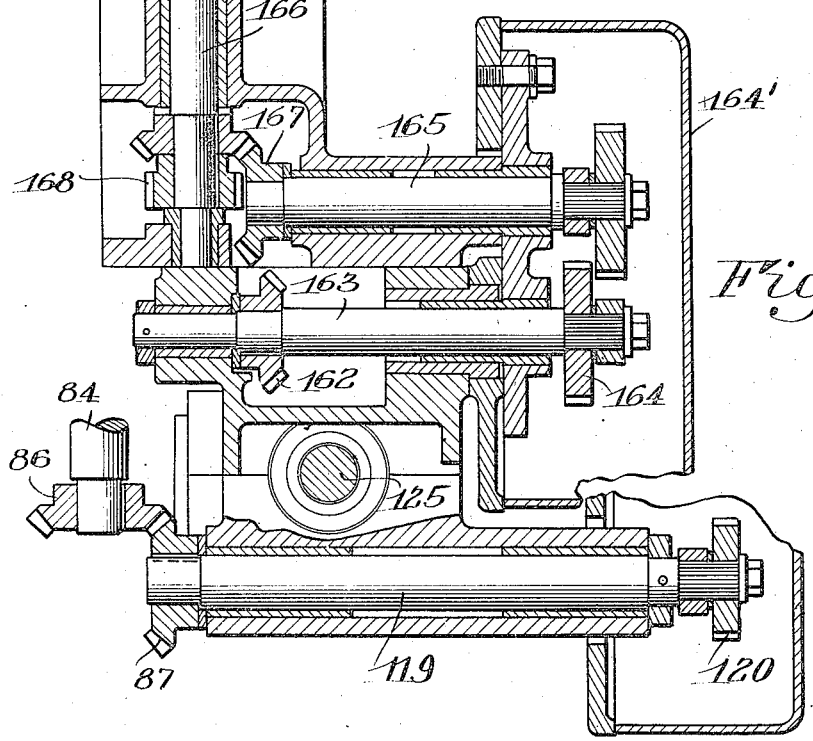

Feb. 8, 1927.   1,616,439
A. H. CANDEE ET AL
METHOD OF AND MACHINE FOR PRODUCING GEARS
Filed Nov. 23, 1925   32 Sheets-Sheet 19
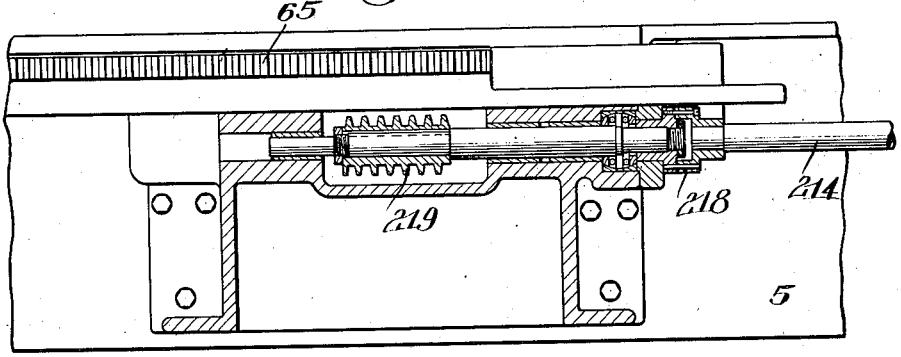
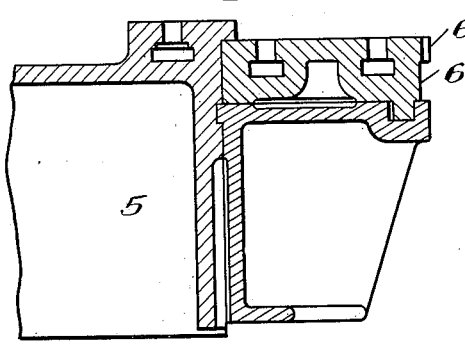
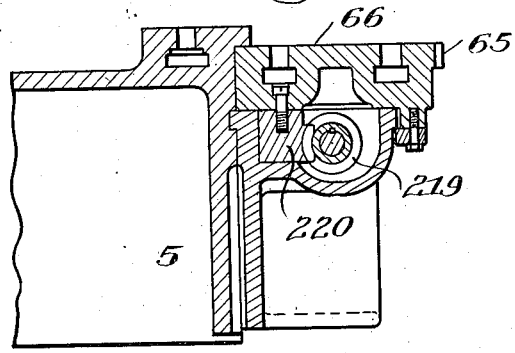
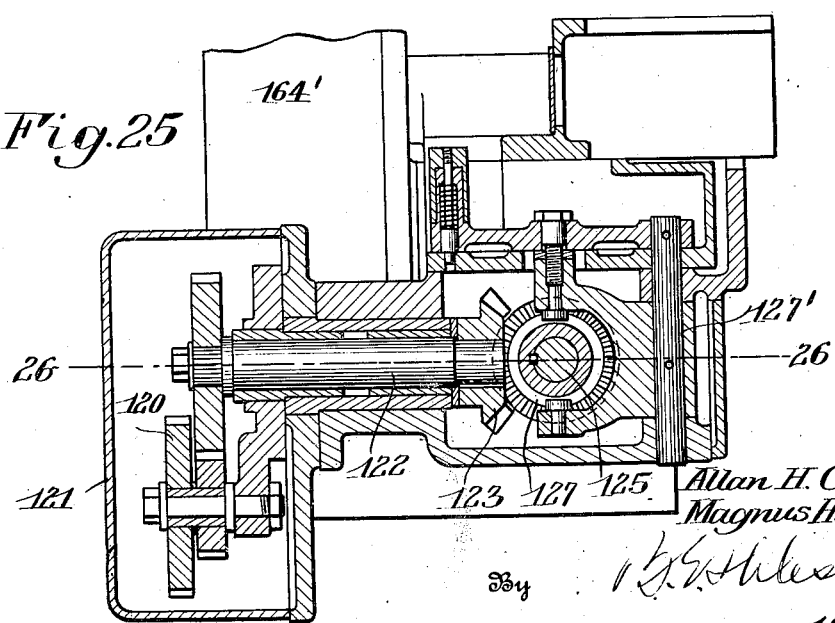
Inventors
Allan H. Candee
Magnus H. Johanson
By
their Attorney Feb. 8, 1927.
A. H. CANDEE ET AL
1,616,439
METHOD OF AND MACHINE FOR PRODUCING GEARS
Filed Nov. 23, 1925
32 Sheets-Sheet 20
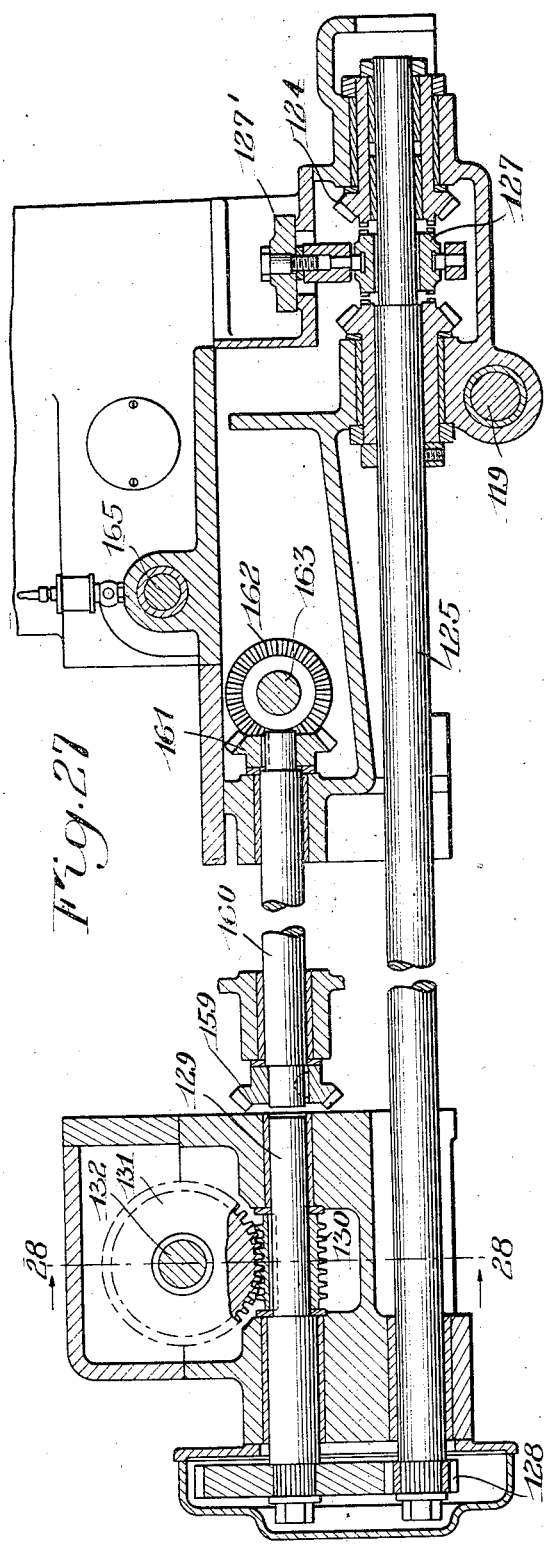
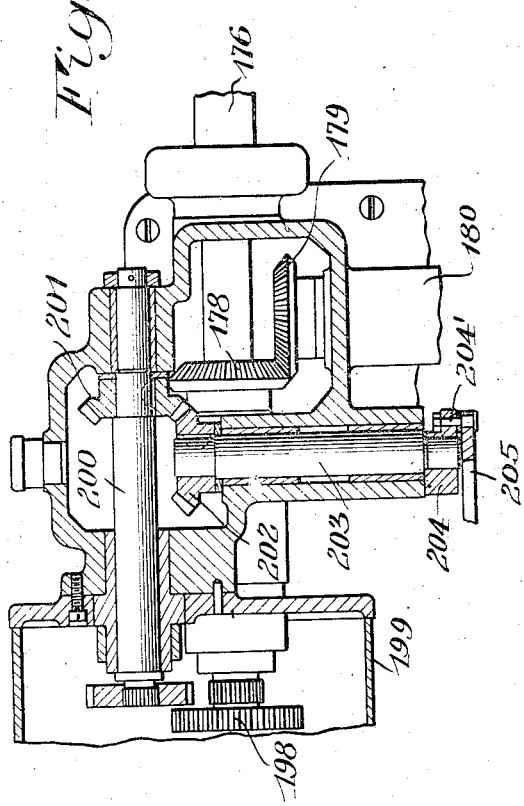
Inventors
Allan H. Candee
Magnus H. Johanson
By
their Attorney

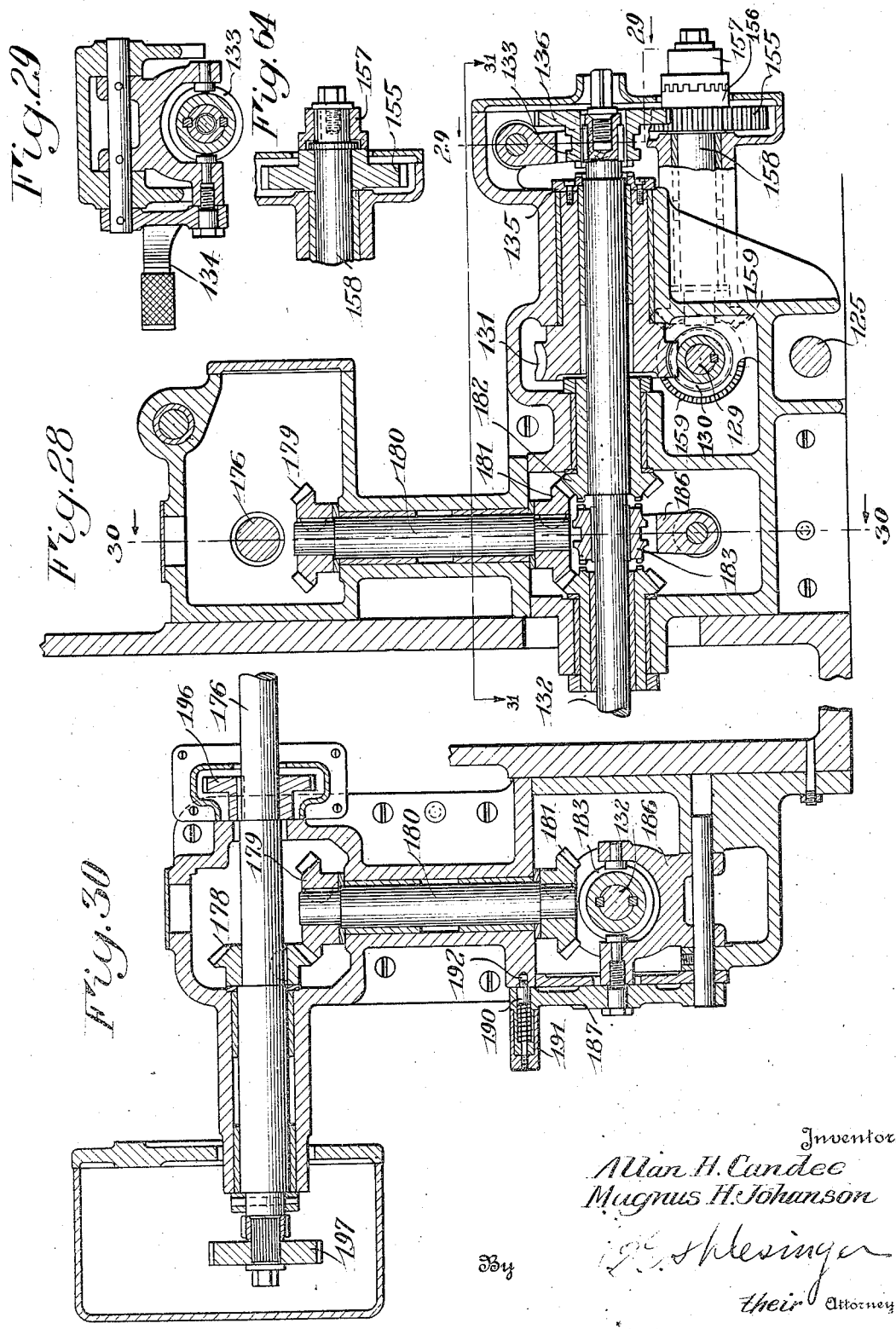

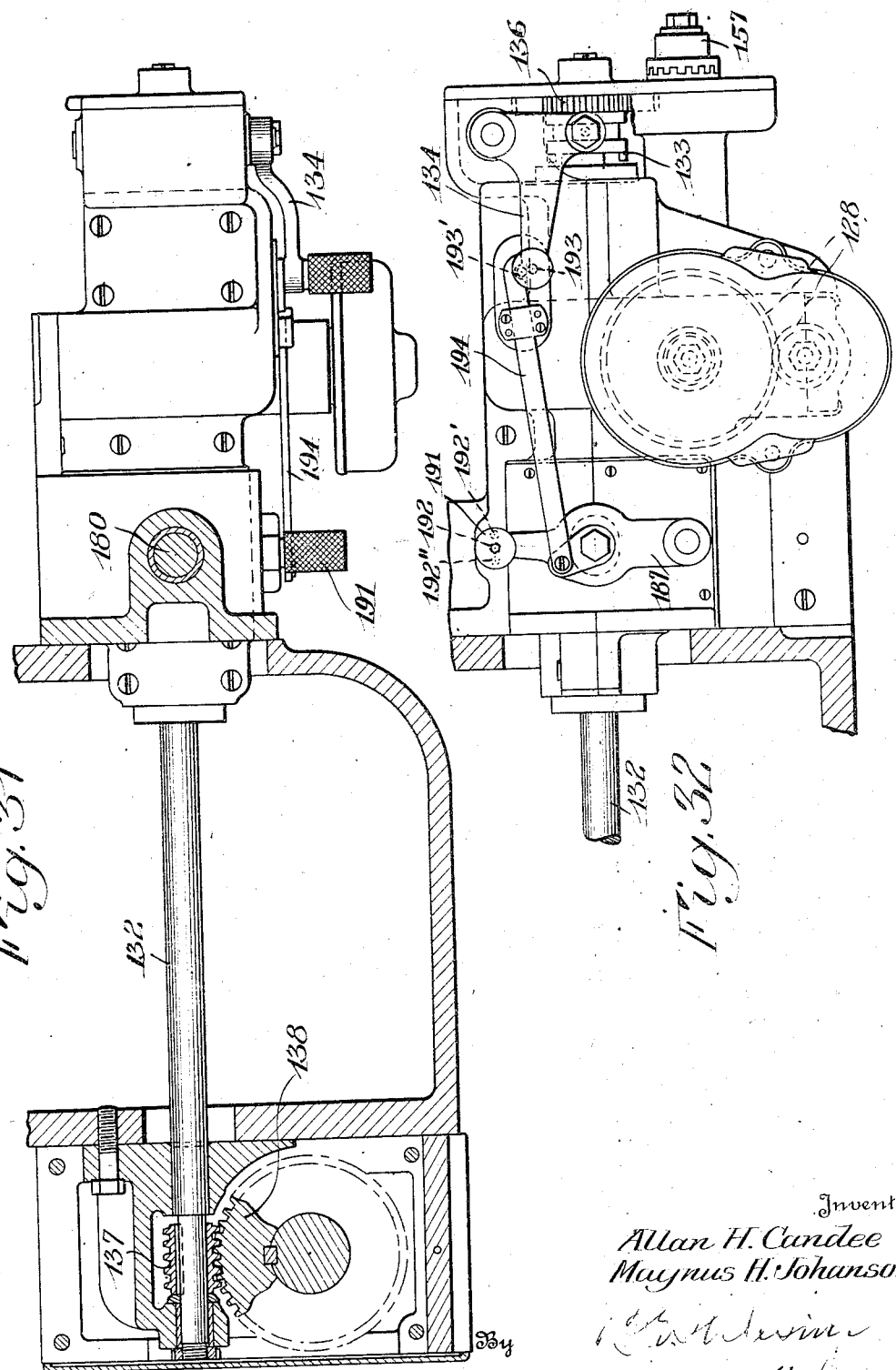

Feb. 8, 1927.

A. H. CANDEE ET AL 1,616,439

METHOD OF AND MACHINE FOR PRODUCING GEARS

Filed Nov. 23, 1925    32 Sheets-Sheet 23

INVENTORS
Allan H. Candee
Magnus H. Johanson
BY
their ATTORNEY

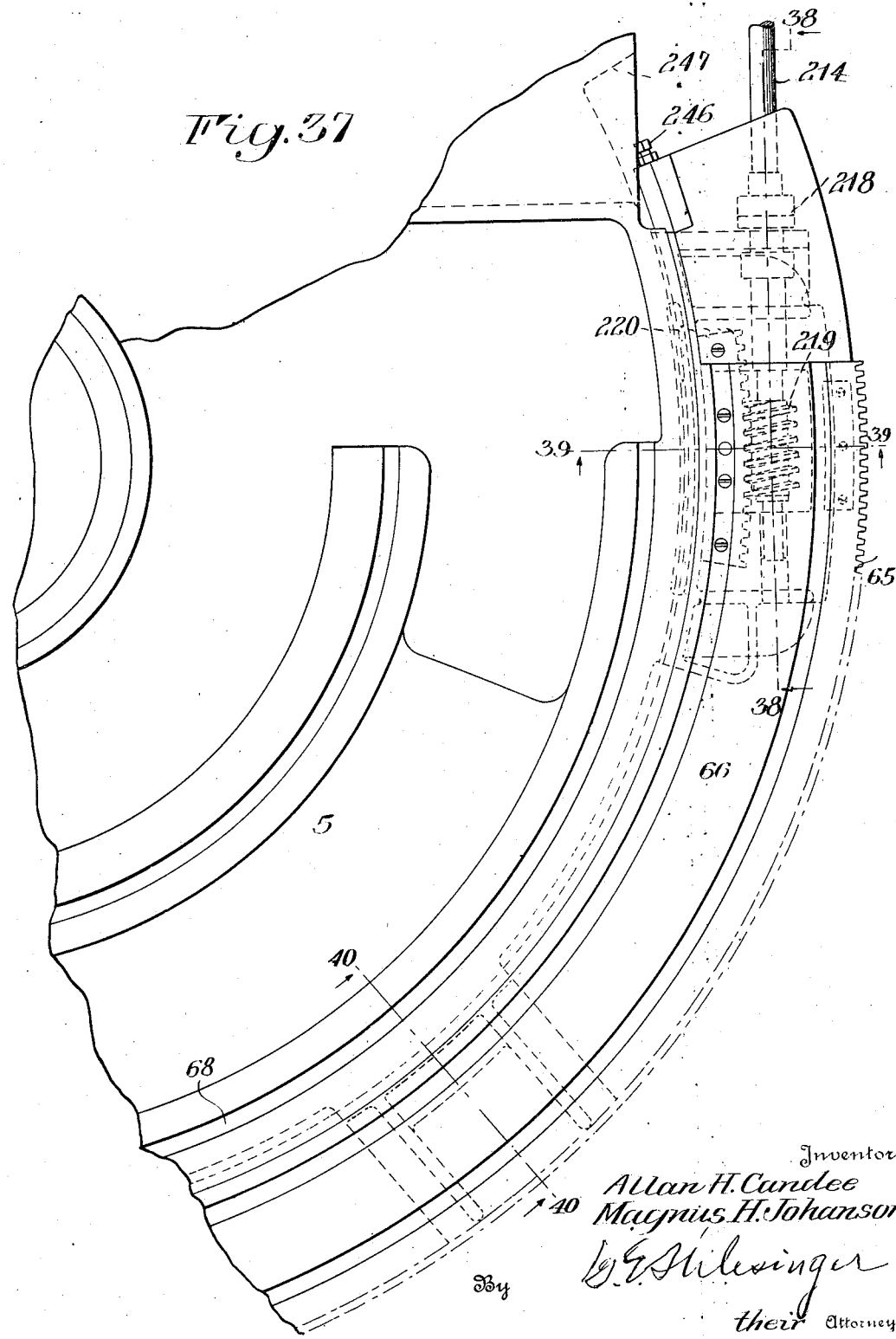

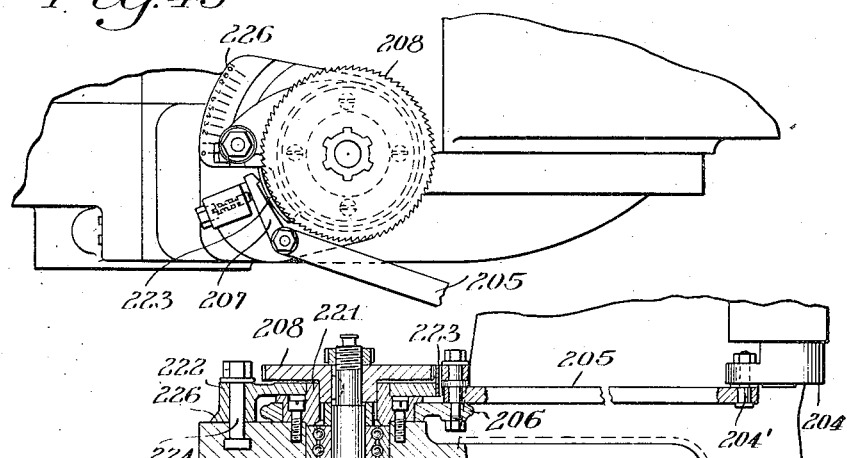
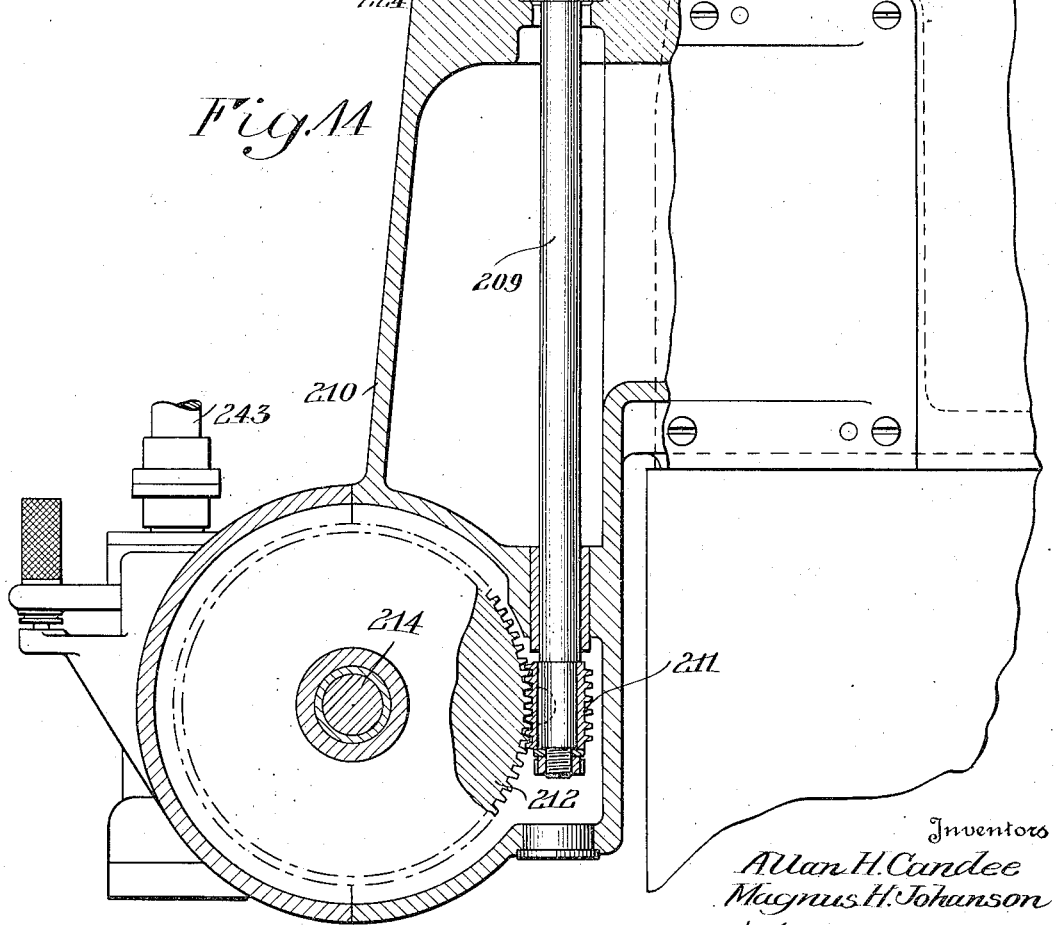

Feb. 8, 1927.

A. H. CANDEE ET AL 1,616,439

METHOD OF AND MACHINE FOR PRODUCING GEARS

Filed Nov. 23, 1925    32 Sheets-Sheet 26

Inventors
Allan H. Candee
Magnus H. Johanson
By
their Attorney

Feb. 8, 1927. 1,616,439
A. H. CANDEE ET AL
METHOD OF AND MACHINE FOR PRODUCING GEARS
Filed Nov. 23, 1925. 32 Sheets-Sheet 27
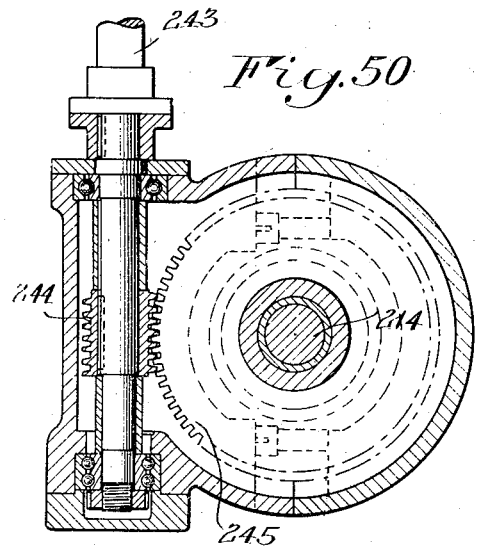
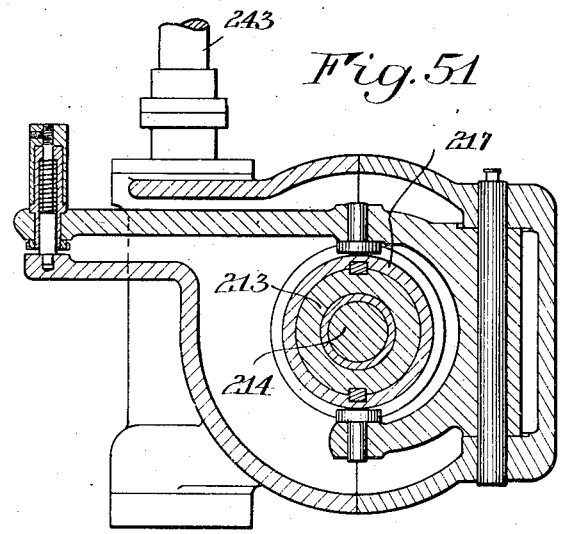
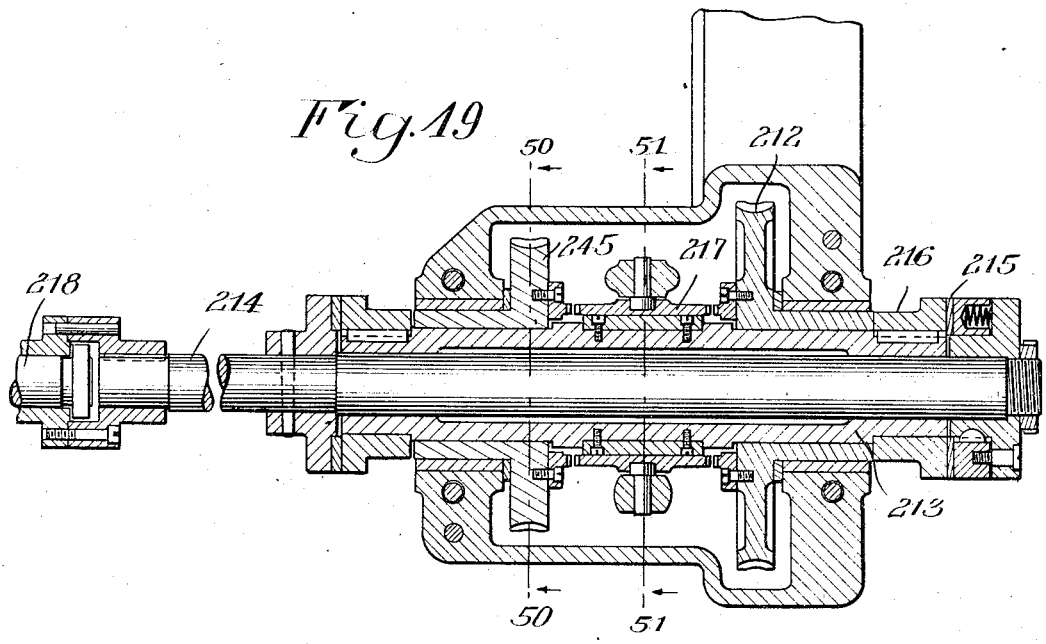
Inventors
Allan H. Candee
Magnus H. Johanson
By B. E. Alevinger
their Attorney Feb. 8, 1927. 1,616,439
A. H. CANDEE ET AL
METHOD OF AND MACHINE FOR PRODUCING GEARS
Filed Nov. 23, 1925   32 Sheets-Sheet 28
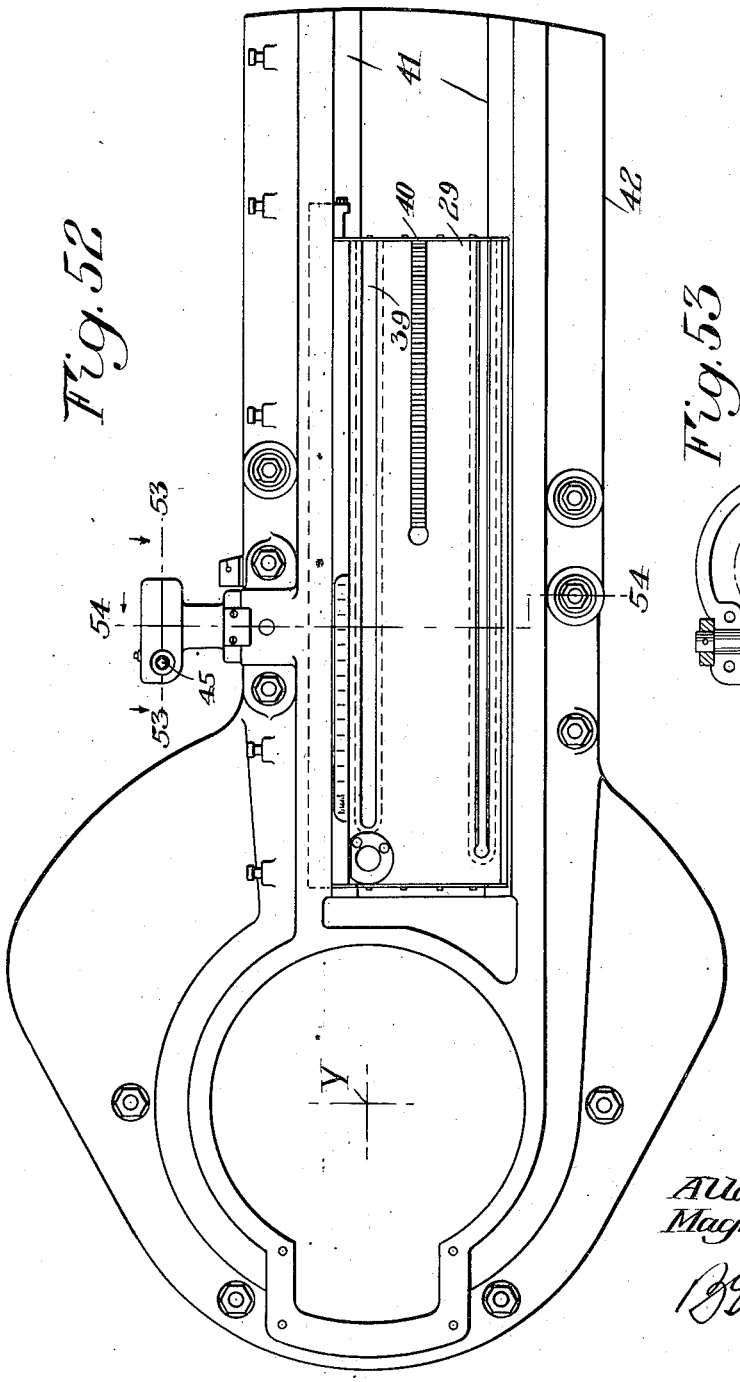
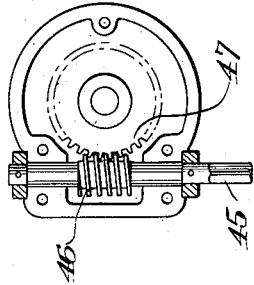
Inventors
Allan H. Candee
Magnus H. Johanson
B. Schlesinger
their Attorney

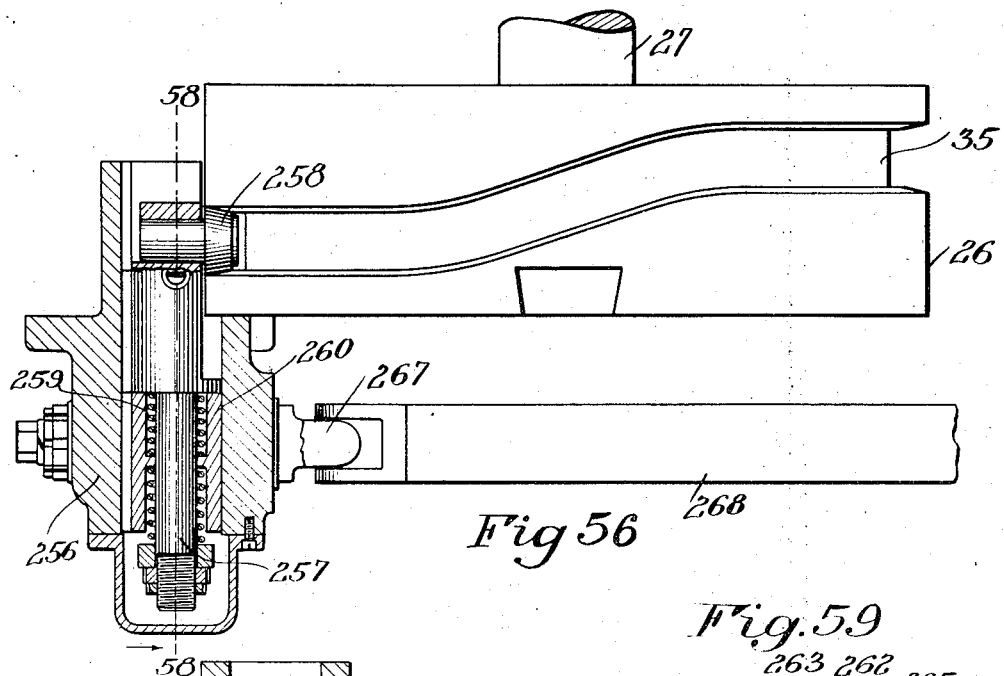

Feb. 8, 1927.
A. H. CANDEE ET AL
1,616,439
METHOD OF AND MACHINE FOR PRODUCING GEARS
Filed Nov. 23, 1925
32 Sheets-Sheet 30
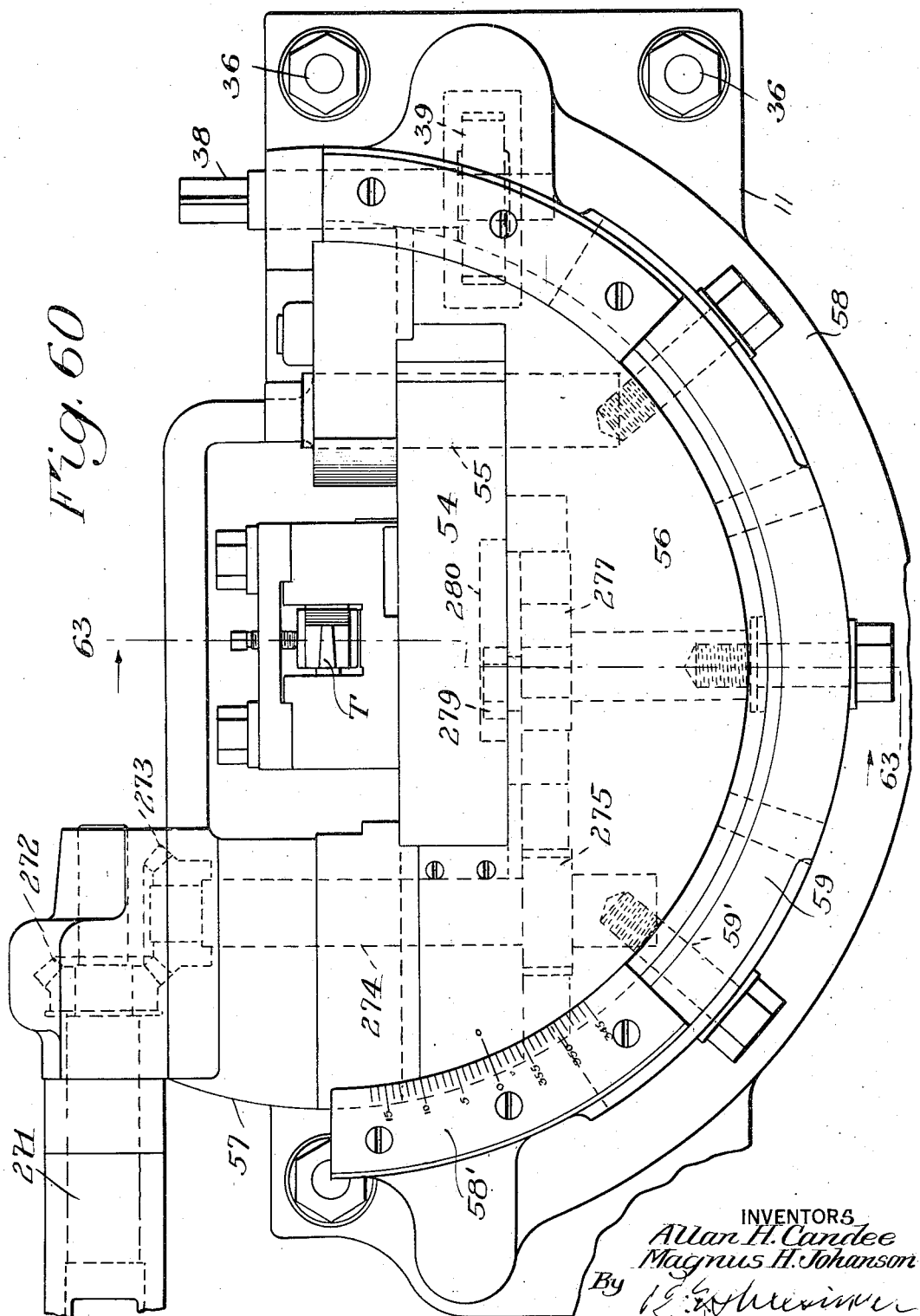
INVENTORS
Allan H. Candee
Magnus H. Johanson
By
their ATTORNEY

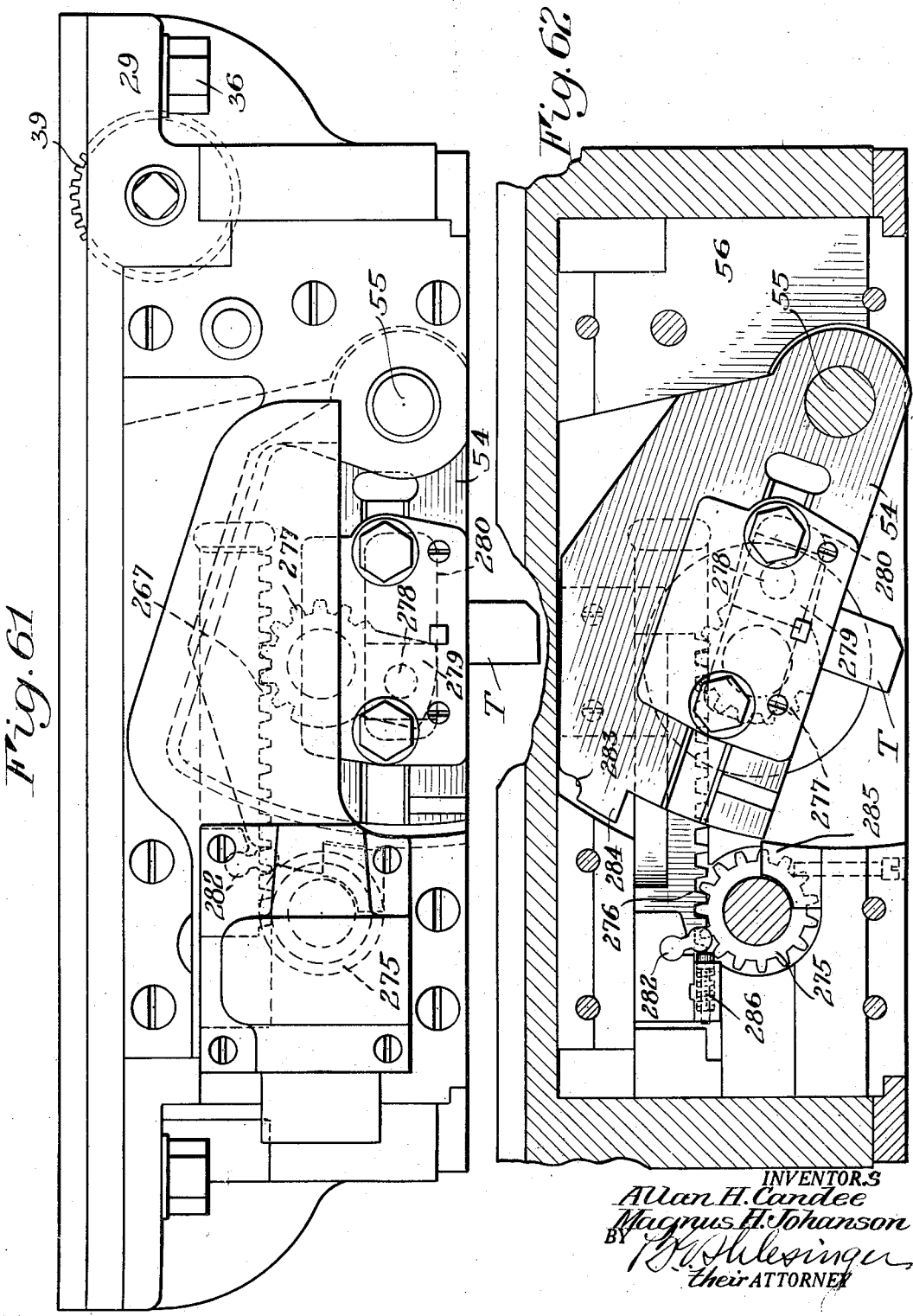

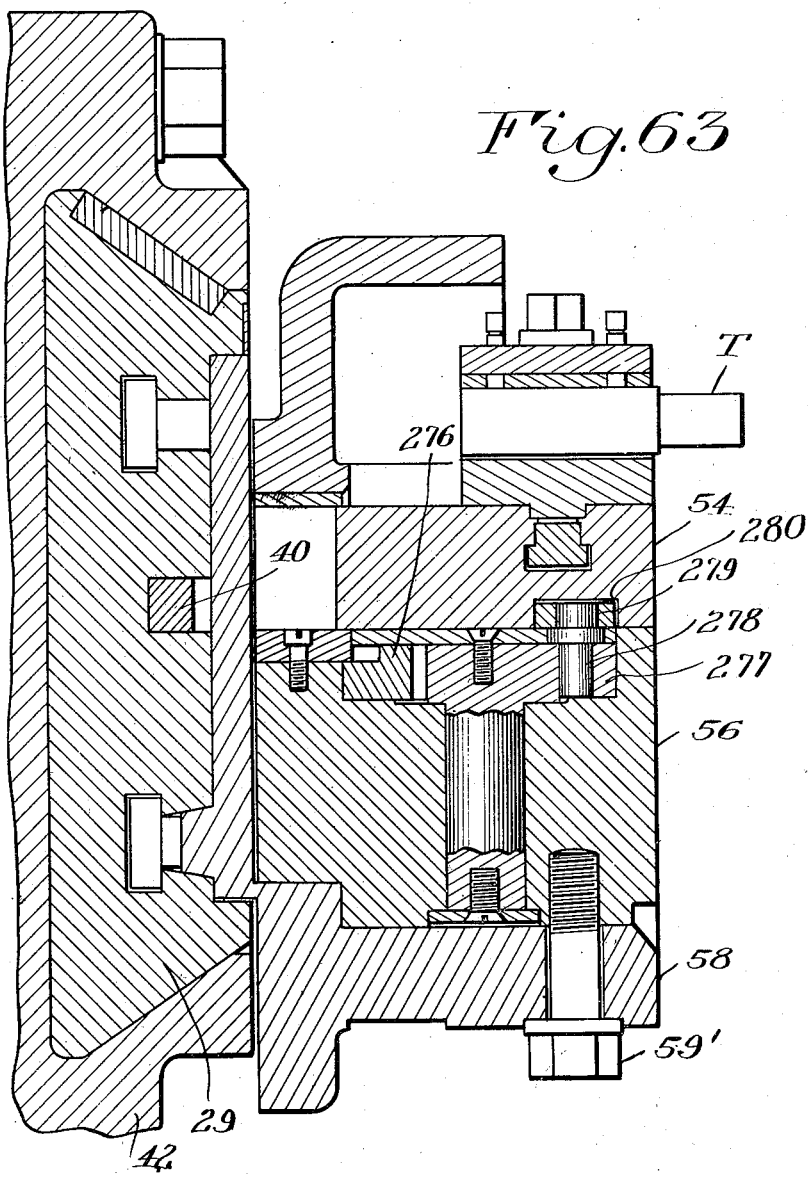

Patented Feb. 8, 1927.

1,616,439

UNITED STATES PATENT OFFICE.

ALLAN H. CANDEE AND MAGNUS H. JOHANSON, OF ROCHESTER, NEW YORK, ASSIGNORS TO GLEASON WORKS, OF ROCHESTER, NEW YORK, A CORPORATION OF NEW YORK.

METHOD OF AND MACHINE FOR PRODUCING GEARS.

Application filed November 23, 1925. Serial No. 70,864.

The present invention relates to gears and particularly to a method and machine for producing gears having longitudinally curved teeth. Specifically this invention relates to a method of producing curved tooth bevel gears by a continuous planing process.

When a tool is reciprocated in a straight path across the face of a blank, which is rotating continuously and at a uniform rate on its axis, a curved slot is cut in the blank. The rotation of the blank while the tool is out of cutting position and during the time it is being returned to its initial position preparatory to another cut, will cause the blank to be automatically and continuously indexed. This method of producing curved tooth gears has certain advantages, particularly for large size gears, among which are chiefly the economy in tool cost and the saving in cutting time over any method in which the blank is intermittently indexed. Attempts have been made from time to time, therefore, to employ this process in the production of curved tooth bevel gears, but heretofore without commercial success.

Difficulties have been experienced because of the limitations in the choice of spiral angle, and because of the considerable variation in the tool clearance angle during the cutting operation, which may cause chattering or a poor finish on the surface being cut. The present invention aims to overcome both these difficulties and to render possible the finish cutting of bevel gears of any desired spiral angle by a continuous planing process.

In the production of bevel gears by such continuous planing processes as have heretofore been employed, the tool has always been reciprocated toward the cone apex of the blank. But where a tool so moved makes successive cuts in successive tooth spaces of the blank, the spiral angle for a gear of a given number of teeth and for a given stroke is fixed and the only way of exercising any control over the spiral angle is to so time the tool and blank movements as to cause the tool to skip a number of tooth spaces between successive cuts on the blank. While this latter method allowed some range in the choice of the spiral angle, through varying the number of teeth skipped, the choice was quite limited in practice and this method only increased the variation in the tool clearance angle present where the tool cut upon successive teeth.

One object of the present invention is to provide a method of planing curved tooth gears in a continuous process, in which the spiral angle producible on the blank may be varied at will while at the same time, the tool clearance angle is maintained substantially uniform.

We have discovered that complete freedom in the choice of spiral angle is possible, if the tool is positioned relative to the blank so that it moves in a line offset from the blank apex. The amount of offset may be varied at will, and by varying the amount of offset any desired spiral angle can be produced on the blank. This freedom in choice of spiral angle is possible, moreover, within the requirements for a satisfactory cutting action of the tool, so that with our invention it is possible to cut any desired spiral angle while maintaining a satisfactory tooth finish.

A further fundamental discovery in our invention is a method of controlling the shape of the cut so as to produce by a continuous planing process a tooth curved in one direction only.

The motions heretofore employed in cutting curved tooth gears with a planing tool, driven by a crank drive, have been the reciprocating motion of the tool toward the blank apex which, is at a varying velocity and of a harmonic nature; the rotary motion of the blank which is at a uniform velocity; and, when the tooth profiles were generated, a relative movement of translation between the tool and blank on the surface of the basic rack or crown gear. The motion imparted to a planing tool by a crank is of a simple harmonic nature, the tool moving under impulse of the crank at a continuously varying velocity, the change in which is of a recurring character. The harmonic or variable motion of the tool under actuation of the crank produces a curve of general S shape. The results attained by offsetting the tool have already been discussed. But beyond this, we have discovered that by imparting another relative motion between tool and blank in addition to the relative motions, heretofore employed, also of a harmonic nature, but preferably of a different frequency from the harmonic motion of the tool, a tooth or groove can be cut on the blank which will have not only a substantially uniform tool clearance angle along its length, but which will also extend substantially in one direction, a result heretofore unobtainable by any method of cutting gears according to a continuous planing process which employed a crank. The spiral angle produced in a machine employing this additional motion can be controlled as already indicated by the amount of offset of the tool, it being within the contemplation of our invention to offset the tool any suitable distance either side of the blank apex or even, where this additional motion is employed, to move the tool toward the apex.

The added harmonic motion which constitutes one of the novel features of this invention may be imparted to the tool or blank in any one of three ways; (1) by an added rotation of the blank at a variable velocity to combine with the continuous uniform rotary movement heretofore employed; (2) by a second reciprocation of the tool at a variable velocity to be combined with the reciprocation caused by the crank and (3) by an added relative movement between the tool and blank at a variable velocity on the basic rack or crown gear.

For convenience in practising this invention it is desirable that machines constructed according to the same have not only an adjustment for offsetting the tool from the apex of the blank and means for driving the tool in such offset position, but also be provided with means for imparting to the tool and blank the relative added harmonic motion, whereby gears of all sizes and pitches may be cut with substantially uniform tool clearance and with any desired spiral angle. The machine, forming one embodiment of our invention and hereinafter described, is so equipped.

In this machine the added harmonic motion is obtained by imparting an additional relative movement between tool and blank about the axis of the basic crown gear. In the machine hereinafter described the tool is reciprocated in a straight line in a path which is adjustable relative to the cone apex of the blank; the blank is rotated on its axis at a uniform velocity, the relative motion between the tool and blank, necessary to produce the generated tooth profiles, is secured by a translation of the tool at a relatively slow uniform rate about the apex of the basic crown gear, while the added relative harmonic motion is obtained by imparting a further movement to the tool also about the apex of the basic crown gear. The tool or tools as in other planing machines will cut on its movement in one direction only, being out of cutting position on the return stroke.

The principal objects of our invention have already been described. Other objects will be apparent hereinafter from the specification and the accompanying claims.

While a preferred embodiment of this invention is described and illustrated, it will be understood that our invention is capable of various other modifications, already indicated or within its scope, and that this application is intended to cover all the variations, or modifications of the invention as fall within its limits or the scope of the appended claims.

In the drawings:

Fig. 1 is a diagrammatic view, illustrating the forms of curves produced through the various harmonic motions employed or employable in our machine and process, and the curve resulting when these motions are combined;

Fig. 2 is a diagrammatic view illustrating the operation of a preferred form of machine;

Fig. 3 is a diagrammatic view showing a portion of a gear cut according to our invention and the position of the tool during the cut;

Fig. 5 is a plan view of this machine;

Fig. 8 is also a partial rear elevation of the cradle support, showing certain parts not found in Fig. 7;

Fig. 9 is a sectional view through the cradle and cradle support, showing the mechanism for imparting to the tool its reciprocating motion and showing also a portion of the cradle drive;

Fig. 10 is a sectional view on an enlarged scale of certain of the parts shown in Fig. 9;

Fig. 11 is a detailed sectional view, showing the final cradle drive;

Fig. 12 is a detail sectional view, taken at right angles to Fig. 11;

Fig. 13 is a section on the line 13—13 of Fig. 11;

Fig. 15 is an enlarged view of the lubricating mechanism and other parts seen in Fig. 14;

Fig. 18 is a detail sectional view, taken generally on the line 18—18 of Fig. 21, showing portions of the blank drive and index change gears;

Fig. 21 is a side elevation partly in section of the index change gears and associated parts;

Fig. 22 is a detail sectional view, showing the final drive to the work head worm;

Fig. 23 is a side elevation, with parts broken away, of the differential ratio change gears, the roll feed change gears, and associated parts;

Fig. 24 is a section on the line 24—24 of Fig. 23;

Fig. 25 is a section on the line 25—25 of Fig. 23;

Fig. 26 is a section on the line 26—26 of Fig. 25;

Fig. 27 is a sectional view taken generally along the line 27—27 of Fig. 26;

Fig. 28 is a section on the line 28—28 of Fig. 27;

Fig. 29 is a section on the line 29—29 of Fig. 28;

Fig. 30 is a section on the line 30—30 of Fig. 28;

Fig. 31 is a sectional view taken generally on the line 31—31 of Fig. 28, looking in the direction of the arrows;

Fig. 32 is a side elevation, with parts broken away, at right angles to Fig. 31;

Fig. 33 is a detail sectional view showing the differential ratio change gears and associated parts;

Fig. 34 is a sectional view through the base and frame of the machine, showing the mounting for the gear and pinion head bases;

Fig. 37 is a plan view, with parts broken away, of the frame showing the means for moving the work head base to feed the gear blank into depth;

Fig. 38 is a section on the line 38—38 of Fig. 37;

Fig. 39 is a section on the line 39—39 of Fig. 37;

Fig. 40 is a section on the line 40—40 of Fig. 37;

Fig. 41 is a section on the line 41—41 of Fig. 8;

Fig. 42 is a section on the line 42—42 of Fig. 8;

Fig. 43 is a detail sectional view of the feed change gears and associated parts;

Fig. 44 is a sectional view, showing details of the blank ratchet feed mechanism;

Fig. 45 is an end elevation of the ratchet and pawl shown in Fig. 44;

Fig. 46 is a sectional view showing the rapid feed clutch and associated parts;

Fig. 47 is a detail sectional view taken in a plane parallel to the plane on which the section, Fig. 46, is taken;

Fig. 48 is a section on the line 48—48 of Fig. 8;

Fig. 49 is a sectional detail view through the feed drive;

Fig. 50 is a section on the line 50—50 of Fig. 49;

Fig. 51 is a section on the line 51—51 of Fig. 49;

Fig. 52 is a side elevation, with parts removed, of the tool slide arm;

Fig. 53 is a section on the line 53—53 of Fig. 52;

Fig. 54 is a section on the line 54—54 of Fig. 52;

Fig. 55 is a detail sectional view on an enlarged scale of the mechanism for reciprocating the tool;

Fig. 56 is a detail, partly in section, of the tool withdrawing cam and associated parts;

Fig. 57 is a lay-out of this cam;

Fig. 58 is a section on the line 58—58 of Fig. 56;

Fig. 59 is a section on the line 59—59 of Fig. 58;

Fig. 60 is a side elevation of the tool head;

Fig. 61 is a plan view of the same, showing the tool in cutting position;

Fig. 62 is a sectional view through the tool head, showing the tool in non-cutting position;

Fig. 63 is a sectional view on the line 63—63 of Fig. 60; and

Fig. 64 is a detail sectional view of parts shown in Fig. 28.

Figure 4:
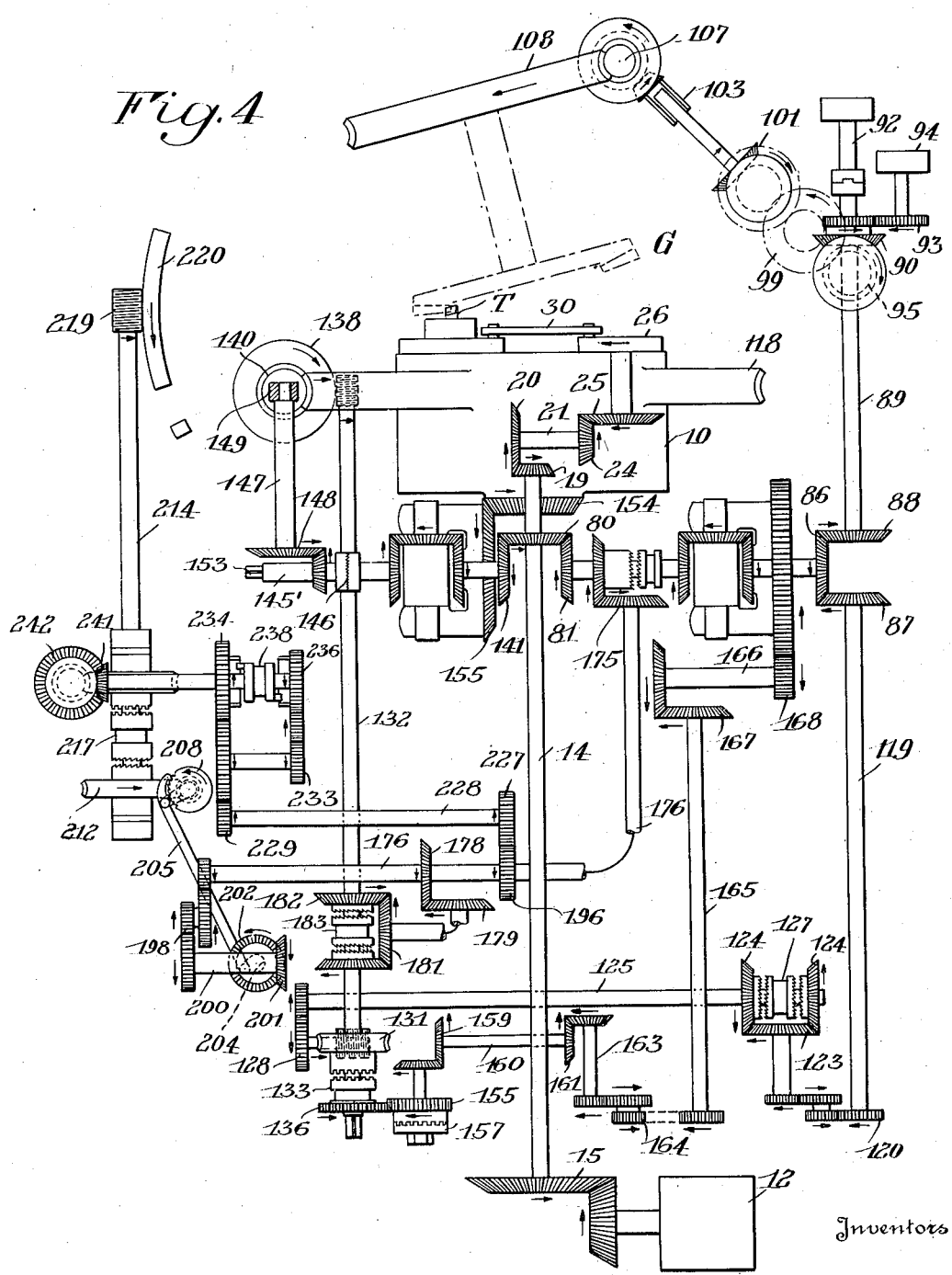
Fig. 4 is a diagrammatic view showing the general arrangement of the gearing controlling the several parts of a machine operating according to a preferred embodiment of our invention.

The principles underlying the present invention are illustrated diagrammatically in Figures 1, 2, and 3.

The present invention relates particularly to the production of curved teeth on conical gear blanks. In the following description, the invention is set forth specifically in its application to the production of curved tooth bevel gears.

In Fig. 1 the various curves produced by the various motions employed or employable in a machine operating according to this invention are shown on the pitch surface of the blank developed into the plane of the basic crown gear. In this figure M represents the circle on which the crank pin moves. This circle has a radius $r$. The crank is connected by a rod L with a tool (not shown) reciprocable along a straight line DH which is offset from the apex X of the blank by an amount equal to the radius of the circle E. The tool may be offset to either side of the apex X. If the crank M rotates in the direction indicated by the arrow $a$, for instance, it will produce a tool movement along the line DH in the direction of the arrow $b$. This movement of the tool which is at a variable velocity and of a simple harmonic nature because of the crank, will produce on the blank which is rotating at a uniform velocity in the direction of the arrow $c$ a longitudinally curved cut of general S-shape, such as shown at A in this figure. For the sake of clearness in illustration this curve A, is shown separate from the lines indicating the tool movement. Corresponding positions of the tool, crank, and blank, however, are indicated by corresponding reference numerals, so that it may be clear what positions the tool crank, and blank occupy as the various portions of the curved cut A are produced. The dotted ends of the curve indicate the path of the tool on its return or idle stroke.

The spiral angle $\phi$ (Fig. 3) of the slot or tooth A is directly controllable in our invention by the amount of the offset of the tool path from the apex of the blank. Satisfactory gears may be cut according to our invention by using the tool offset combined with the usual blank and tool motions heretofore employed. Where it is desired, however, to produce on the blank a tooth which extends substantially in one direction, the added harmonic motion, new with this invention, is employed. Preferably this motion will be at twice the frequency of the harmonic motion of the tool caused by the crank movement, as it has been found that such a combination gives the most desirable results as regards tool clearance and spiral angle. Whether this added harmonic motion be applied to the tool or to the blank or, as in the embodiment of our invention herein illustrated, to the crown gear rotation, the curve produced will be substantially the same.

Any suitable means may be employed for obtaining this added motion, as a crank, an eccentric, etc. In the machine hereinafter described an eccentric is employed. This eccentric is indicated diagrammatically at F in Figure 1. If the tool is reciprocated along the path DH as previously described and the blank is simultaneously reciprocated about its axis, or the center of the basic crown gear, X at a variable rate under actuation of the eccentric F which is rotating in one direction indicated by the arrow $d$, a curve will be produced on the blank such as shown at B. Corresponding positions of the tool, blank and eccentric, during the formation of the curve B, are indicated by corresponding reference numerals. As the eccentric is preferably rotated at twice the speed of the crank M, the six indicated positions of the eccentric will correspond to the twelve indicated positions of the tool.

When the motions which produce the curves A and B are combined a curve C will result, the distance $1^a$—$1^b$ on the curve C, for instance being the algebraic sum of the distances $1^a$—$1^b$ on the curves A and B. This curve extends in substantially the same direction throughout its length, without any reversal of curvature, which is a characteristic of the curves shown at A and B.

No attempt has been made in Figure 1 to show the generating motion, as this motion has no effect on the longitudinal tooth curve produced on a gear manufactured according to this invention.

Figure 2 illustrates diagrammatically the principle of operation of the machine described hereinafter. The tool T is actuated by the crank disc M through the connecting rod L. This tool moves in a straight line offset from the apex X of the blank or of the basic crown gear. The blank I itself rotates continuously and at a uniform velocity on its own axis. To produce the generated tooth profiles, the tool and blank are moved relatively to each other about the axis of the basic crown gear. This movement is derived from a worm V which is driven from any suitable source of power and which rotates the shaft Q through the worm wheel S. Secured to the shaft Q is a worm W which rotates in mesh with and drives the worm wheel R which is secured to the cradle and whose axis coincides with the axis of the basic crown gear. Where the added harmonic motion is employed, the tool and blank are given an added motion relative to each other about the axis of the basic crown gear. This added harmonic motion is produced by the eccentric F which imparts a longitudinal reciprocating movement to the shaft Q and the worm W, and through the worm W an oscillating movement to the worm wheel R, and to the tool.

The worm wheel S has a splined connection with the shaft Q, whereby the shaft may be rotated and reciprocated simultaneously—and impart its combined motion to the cradle.

Figure 3 is a fragmentary sectional view of a bevel gear such as might be produced by this invention when the added harmonic motion is used. In this figure the tool path is shown at DH offset from the apex X of the blank, the spiral angle of the tooth is indicated at $\phi$ and the tool clearance angle at $\psi$. The gear has teeth curved in one direction only.

One embodiment of a machine for producing bevel gears, according to this invention, is shown in the drawings accompanying this specification.

This machine comprises the base 5 which may be bolted to the floor or to a concrete foundation by bolts 5' (Figures 6 and 34) and on which may be adjustably mounted a gear head support 6 (Fig. 5) or a pinion head support 7 and to which is rigidly fastened a frame 8 (Fig. 6) provided with circular bearings 9 and 9' (Fig. 9) in which is rotatably mounted the cradle 10 (Figs. 6 and 9) which carries the tool head 11 and the tool T. The axis X of the cradle 10 represents the axis of the basic gear with which in the generating process the blank is theoretically rolled. The blank and tool carriers are adjustable, as will be more fully described hereinafter to bring them into cutting position. In addition to the mechanism provided for imparting to the tool, the blank, and the cradle, the required motions to produce a generated gear having the desired longitudinal tooth curvature, mechanism is further provided for feeding the blank relatively to the tool so as to cut the teeth to the desired depth.

The various drives and adjustments will be taken up in order.

A motor 12 (Figs. 4 and 9 or any other suitable source of power, may be employed to impart to the various parts their motion. This motor is supported on a bracket 13 which is secured to the frame 8.

Mechanism for reciprocating the tool.

The motor 12 imparts a rotary movement to the main drive shaft 14, which is journalled in a sleeve 15 secured to the cradle 10 and in a bearing 16 secured to the frame 8, through the bevel gearing 17, one member of which is keyed to the shaft 14 and the other member of which is connected to the armature shaft 18 of the motor. The shaft 14 is preferably arranged coaxial with the cradle, and to the inner end of the shaft 14 is keyed a bevel pinion 19 which meshes with and drives a bevel gear 20 to the shaft 21 which is journalled in suitable bearings 22 and 23 (Figs. 9 and 55) in the cradle 10 and which carries at its inner end a bevel gear 24 which meshes with and drives a bevel gear 25 secured to the crank member 26. The spindle 27 of the crank 26 is suitably journalled in a bearing 28 in the cradle. The crank member 26 is connected to the tool head slide 29 by a connecting rod 30 one end of which is journalled on a pin 31 secured to the tool head slide 29 and the other end of which is journalled on the crank pin 32. For the purpose of adjusting the throw of the crank, the pin 32 is mounted on a slidable block 33 which may be adjusted to any desired position relative to the axis of rotation of the crank member by the screw 34. By the means already described, it will be seen a reciprocating motion at a variable velocity of a simple harmonic nature is imparted to the tool T. This reciprocating movement moves the tool at a varying velocity across the face of the blank. The crank member 26 has formed on its periphery a cam slot 35, which is utilized as will be more fully hereinafter described to clap the tool out of cutting position and to return it to cutting position when the crank has completed its cycle of movement.

Apparatus for adjusting the tool.

As has already been stated one feature of this invention is the complete freedom obtained in choice of the tooth spiral angle. By offsetting the tool more or less from the blank apex, any desired spiral angle can be produced. This offset cutting is possible moreover without varying the tool clearance angle beyond practical limits. Hence it is possible with our invention to employ the relative tool and blank motions heretofore employed, and produce satisfactory gears of any desired spiral angle. The means for adjusting the tool will next be described.

The tool T is mounted in a tool head 11 (Figs. 4, 6, 9, 52 and 54) that is slidably adjustable on the tool head slide 29, being secured to said slide 29 by the T-bolts 36 which take into slots 37 in the head slide. The tool head may be adjusted on the head slide by unloosening the bolts 36 and rotating the shaft 38 (Fig. 60) as by a wrench or other suitable tool. The shaft 38 carries at its lower end the pinion 39 which meshes with the rack 40 (Figs. 52 and 54) secured to the tool head slide 29. The head can be secured in any adjusted position by retightening the bolts 36.

The tool head slide 29 is reciprocable in ways 41 formed on the arm 42. This arm 42 is adjustable on the cradle 10 about a center Y (Figs. 6 and 52) and can be secured in any adjusted position on the cradle by bolts 43 which engage in slots 44 (Figs. 6 and 9) formed in the face of the cradle (Fig. 9). The arm 42 may be adjusted to any suitable position by rotating the shaft 45 (Figs. 52, 53, 54 and 6) by means of a wrench or other tool, the shaft 45 carrying a worm 46 which meshes with a worm wheel 47 keyed to the shaft 48 journalled in the arm 42. This shaft 48 has secured to its lower end a bevel pinion 49 that meshes with a bevel gear 50 which is fastened to the shaft 51 that is journalled in the arm 42 and carries a spur gear 52 that meshes with the curved rack 53 (Figs. 6 and 9) which is secured to the face of the cradle 10. By rotating the shaft 45, the arm 42 can be adjusted about its axis Y. This adjustment of the arm about the axis Y, will move the tool T relative to the blank apex or crown gear center X, whereby the tool can be offset any desired distance from the apex X.

The tool T is itself mounted in the clapper block 54 (Figs. 61 and 62) which is pivoted, by means of the pin 55 on the clapper block support 56. The clapper block support 56 is provided with an arcuate surface 57 (Figs. 6 and 60) which is adjustable on a correspondingly surfaced bed formed on the tool head 11. The center of curvature of the lower surface of the clapper block support 56 and of the seat for the same on the tool head 11 is at the cutting point of the tool T, so that the tool may be adjusted to obtain the proper tool clearance without altering the pressure angle of the gear to be cut. The tool head seat 58 is provided with arcuate slots 59 which are adapted to receive the bolts 59' which are threaded into suitable recesses in the clapper block support 56 and serve to secure the clapper block support in any adjusted position on the tool head seat. For convenience in setting the clapper block support 56 to any desired position a scale 58' is provided on the seat 58 which registers against a zero index mark on the clapper block support.

By the means described the tool may be offset from the blank apex any desired amount. Thus a gear of any desired spiral angle may be cut.

Mounting for blank.

Either a gear blank or a pinion blank may be cut upon this machine. For the purpose of securing the greatest possible rigidity during cutting, separate supports are provided for the gear and pinion blank heads. These two head supports 6 and 7 are slidably and angularly adjustable on ways provided on the base 5 and the construction is such that the gear head support 6 may be swung out of the way when a pinion is to be cut to permit proper positioning of the pinion blank. It is necessary, however, when cutting a gear, to remove the pinion head support 7 from the base. The construction of the machine, however, is such that this may be quickly and easily accomplished. While we have preferred to employ two separate heads for gear and pinion blanks it will be understood that this is not necessary as any suitable arrangement may be used. The mounting for the blanks will now be described.

Figure 35:
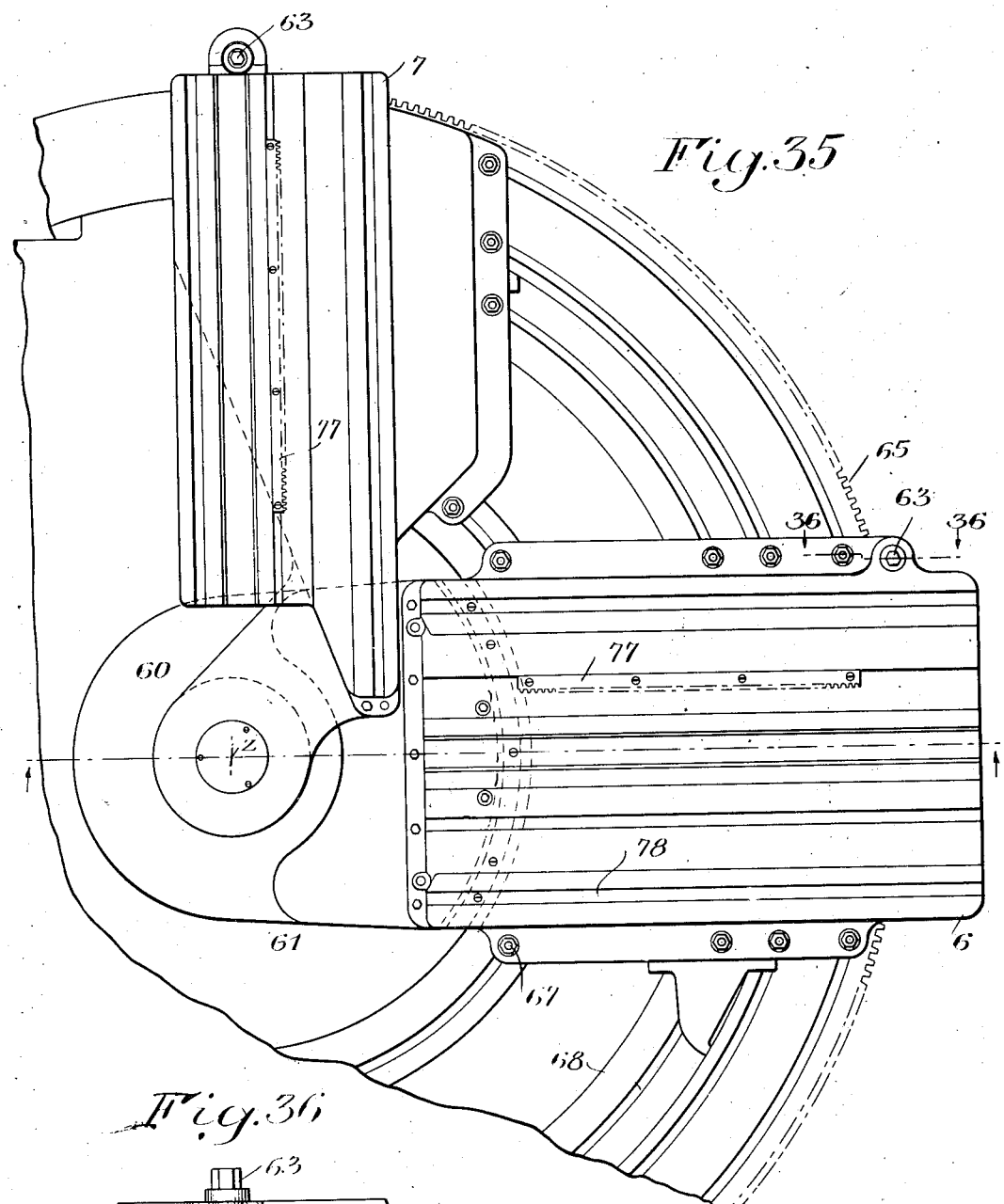
Fig. 35 is a plan view, with parts broken away, of the parts shown in Fig. 34.
Figure 36:
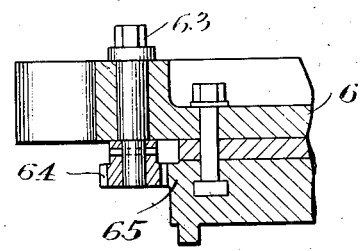
Fig. 36 is a section on the line 36—36 of Fig. 35.

In the drawings, Figures 5, 34 and 35, particularly, we have shown a pinion blank in position to be operated on with both the pinion head carrier 7 and a gear head carrier 6 mounted on the base. Each of these head supports is provided with an angular extension, (Figs. 34 and 35) the extension 60 of the pinion head carrier being journalled in a suitable bearing formed in the angular extension 61 of the gear head carrier 6 and the angular extension 61 of the gear head carrier being in turn journalled in a suitable bearing 62 in the base 5. The pinion head carrier and the gear head carrier are each adjustable about the axis of the bearing 62 by rotation of the shafts 63 (Figs. 35 and 36) one of which is journalled in each of these carriers and which carry pinions 64 meshing with the circular rack 65 which is secured to the feed rail 66. The shafts 63 may be rotated by hand, being provided with hexagonal or other suitably shaped outer ends for receiving a wrench. The blank head carriers can be secured in any adjusted position on the base by the bolts 67 which engage in the circular T-slots 68 formed in the base and by gibs 69 (Fig. 34) that engage a projecting ledge formed on the base.

By the means described the blank to be cut can be swung into cutting relation to the tool, as shown in Figure 5. This figure shows a pinion blank P in position for the cutting operation. When it is desired to cut a gear blank such as shown in dotted lines at G in this same figure the pinion blank carrier will be lifted off the base and the gear blank carrier moved by means of its pinion 64 to proper cutting position. When it is in this position it may be secured to the base 5 by tightening up the bolts 67 in the T-slots 68. The blank to be cut is secured to the blank spindles 70 or 70', as the case may be, (Fig. 5) journalled, respectively, in suitable bearings in the pinion head 71 and the gear head 71'. The two heads are each slidably adjustable on their respective head supports 6 and 7, each head being provided for this purpose with a shaft 72 carrying a spur pinion 73 (Fig. 14) which meshes with spur gear 74 mounted on a shaft 75, which carries at its lower end a pinion 76 meshing with a rack 77, (Figs. 14 and 35) one rack 77 being secured to each of the head carriers 6 and 7. The carriers 6 and 7 are provided with longitudinal slots 78 with which are adapted to cooperate the T-bolts 79 for securing the blank heads in any adjusted position. By means of this last adjustment the blank to be cut can be adjusted to properly position its cone apex—for bevel gears until it coincides with the apex of the basic crown gear.

Means for imparting to the blank its continuous rotation.

Figure 14:
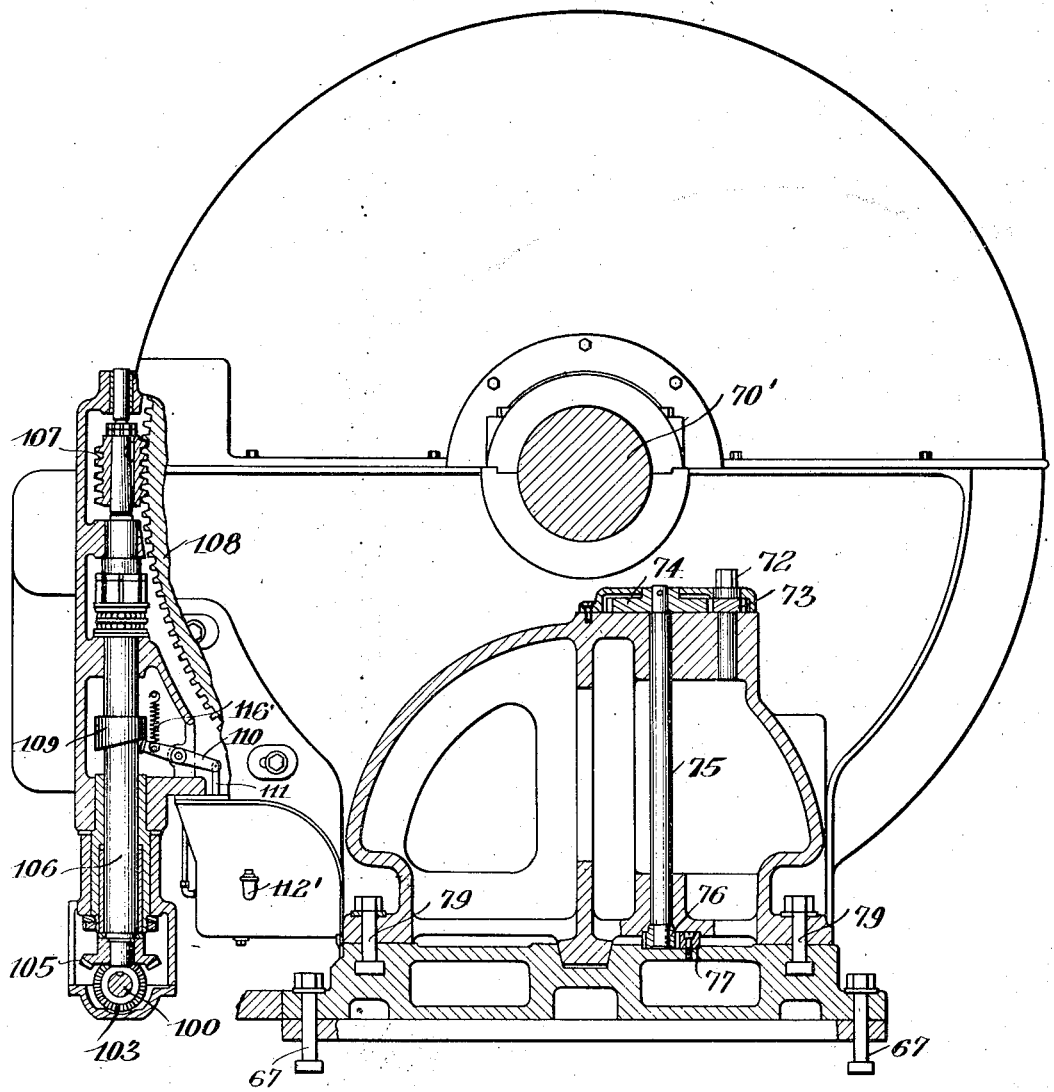
Fig. 14 is a rear elevation, partly in section, of the work head.
Figure 20:
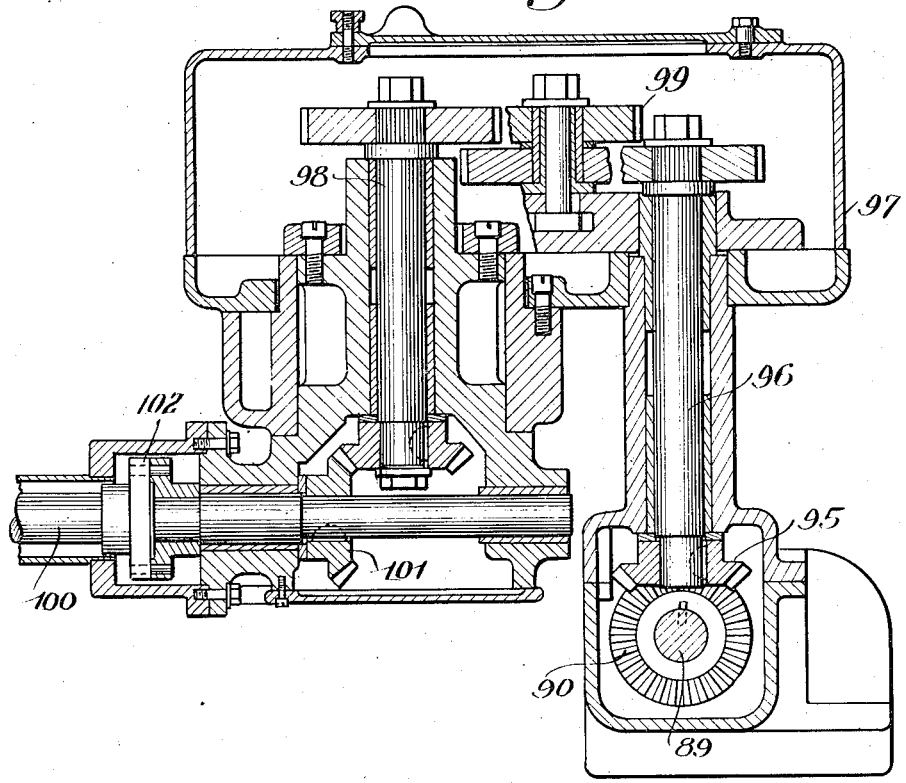
Fig. 20 is a section on the line 20—20 of Fig. 21.
Figure 19:
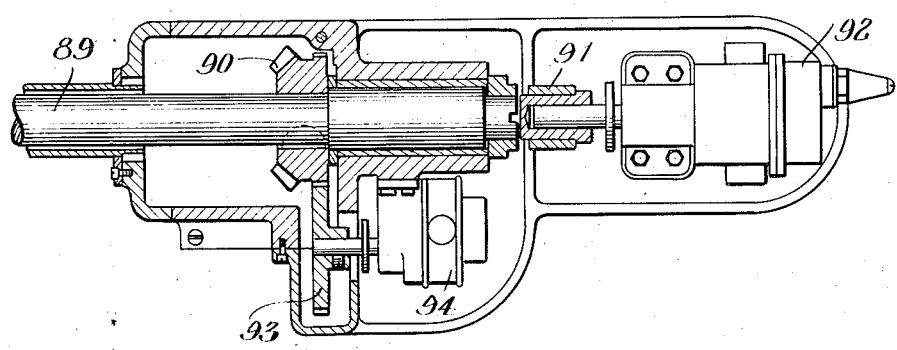
Fig. 19 is a detail sectional view showing the drives for the lubricating and the cutting oil pumps.

Next we shall describe the means for imparting to the blank its continuous uniform rotary movement, which movement assists, during the cutting stroke of the tool, in forming the desired tooth curve and during the idle stroke of the tool is utilized to index the blank to the next tooth or space to be cut. Keyed to the main drive shaft 14 (Figs. 4 and 17), intermediate its length is a bevel pinion 80, forming one of the pair of miter gears, the other member 81 of which is secured to the shaft 82 which drives through a set of differential gears 83 the shaft 84 which is journalled in the differential housing 85 mounted on the frame 8 and which carries at its outer end a bevel pinion 86 which meshes with a bevel pinion 87 and with a bevel pinion 88, shown in dotted lines in Figure 17 and in full lines in Figure 18. This bevel gear 88 is keyed to a shaft 89 which is suitably mounted in the frame 8 (see Fig. 5) and upon which is mounted intermediate its length a combined bevel and spur gear member 90. The rotation of the shaft 89 is utilized through a suitable connection 91 (Figs. 18 and 19) to actuate the cutting oil pump 92, while the spur gear portion of the gear 90 is employed to rotate a spur pinion 93 and thereby actuate the lubricating oil pump 94. The bevel gear portion of the gear member 90 meshes with and drives a bevel gear 95 keyed to the shaft 96 which is suitably journalled in a change gear box 97 secured on the frame 8. The shaft 96 drives the shaft 98 (Figs. 18 and 20) through the change gears 99. This shaft 98 drives the shaft 100, which is mounted in suitable bearings in the frame 8, or a suitable bracket attached thereto through the bevel gearing 101. This shaft 100 may be made in two parts, for convenience, suitably connected together at 102 (Figs. 4, 20 and 5). The structure of the machine is such that the shaft 100 may be utilized to drive either the pinion blank spindle or the gear blank spindle. For this purpose, a detachable connecting member is provided on both blank heads so that this shaft may be put into a driving connection with either blank spindle. As the connections are identical in each head and as the means for rotating each spindle is identical, only one need be described. The shaft 100 has a detachable splined connection with the bevel gears 103 (Fig. 22) one of which is journalled in each of the swivel brackets 104, one of which is secured to each of the blank heads 71 and 71'. Each bevel gear 103 meshes with and drives a bevel gear 105 (Figs. 5, 14, 15 and 22) keyed to the shafts 106 which are suitably journalled in the gear and pinion heads and to which is keyed in each case a worm 107 which meshes with and drives a worm wheel 108 (Figure 14) one of which is housed in each blank head and is suitably connected to each blank spindle. A spacer 103' is provided in each bracket 104 for maintaining each bevel gear 103 in proper meshing position relative to the gear 105. This spacer is also adapted to have a splined connection with the shaft 100. The bracket 104 is swivelled on the shaft 106 (Fig. 22). The structure is such that when the splined shaft 100 is withdrawn from the bracket, the bracket may be rotated on the shaft 106 and the bevel gear 103 brought either into the position shown in Fig. 22 or into the opposite position from that shown in that figure so that the blank can be driven in either direction. When a gear blank is to be cut, the pinion head will be lifted off the machine and the splined shaft 100 connected with the bevel gear 103, in the gear head (Figs. 14 and 15). When a pinion blank is to be cut, the connection will be to the bevel gear 103 in the pinion head as shown in Fig. 5. By the means described a continuous rotary motion will be imparted to the blank.

Figure 16:
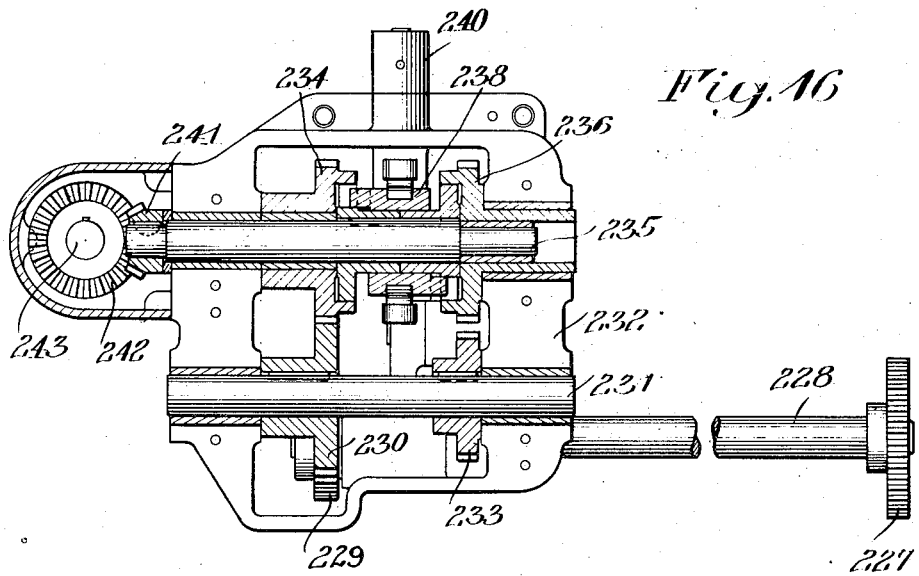
Fig. 16 is a detail sectional view on an enlarged scale of parts of the lubricating mechanism seen in Fig. 15.

One feature of this machine is the mechanism employed for lubricating the final blank drive and cooperating parts. This lubricating mechanism is shown in Figures 14, 15 and 16. Secured to the shaft 106 is a cam member 109 which with each revolution of the shaft 106 depresses one end of the lever 110 which is pivoted at 110' on the blank carrier. Pivoted to the other end of this lever 110 is a piston 111 which serves to pump oil from the reservoir 112 in the blank head and force it to the bearings and other parts of the blank drive mechanism which require lubrication. The reservoir 112 may be filled with oil through the pipe 112'. The operation of the auxiliary pumping mechanism is as follows: On the upstroke of the plunger 111, when the lever 110 is depressed by the cam 109 against the action of the spring 110'', oil is drawn by suction into the channel 113, the ball valve 114 being lifted from its seat 114'. On the down stroke of the piston 110 the ball valve 115 is lifted from its seat and the lubricant which has passed into the channel 113 is forced through the line 116 to the bearing 117 at the upper end of the shaft 106. From this bearing the lubricant flows around the shaft down over the worm and the worm wheel and back into the reservoir 112. By means of this auxiliary pumping mechanism it is possible to efficiently lubricate, automatically, parts which could not be reached by the lubricant pumped from the oil pump 94.

*Mechanism for imparting the generating roll.*

The present invention is applicable to the production of gears both generated and non-generated. Where the gears are to be generated, any suitable generating motion may be employed. The machine forming the embodiment of our invention herein described, is intended primarily for the production of generated bevel gears, in which the generating movement is obtained by rolling the tool and blank relatively to each other in the manner of a bevel gear meshing with a crown gear. The relative translation of tool and blank about the apex or center of the crown gear is secured in this machine by a slow rotation of the cradle 10 on its axis, which represents the axis of the basic crown gear. This relative slow rotation, during the cutting, is imparted to the cradle by the worm wheel 118 (Figs. 4, 9 and 11). The means for imparting to the worm wheel its slow rotational movement will now be described.

As has already been described the main drive shaft 14 drives the bevel gear 87 (Figures 4 and 17) through the shafts 82 and 94, the differential gears 83 connecting said shafts and the bevel gear 86 mounted on the shaft 84. The bevel gear 87 is keyed to a shaft 119 journalled in the frame and carrying at its outer end one of a set of roll feed change gears 120 (Figs. 4, 23, 24 and 25) housed in the change gear box 121 which drive at a suitable velocity the shaft 122 which is journalled in a suitable bracket secured to the frame 8. Keyed to one end of the shaft 112 is a bevel gear 123 which is in continuous mesh with a pair of oppositely driven bevel gears 124 (Figs. 4, 25 and 26) journalled on the shaft 125. These bevel gears 124 are provided with oppositely facing clutch teeth 126 which are adapted to be engaged with the clutch teeth of a sliding clutch 127 which has a splined connection with the shaft 125 and which may be thrown by the clutch arm 127. The gears 120 together with the clutch member 127 form part of a reversing mechanism whereby the cradle may be moved slowly in either direction. The shaft 125 (Figs. 4, 23 and 27) is suitably journalled in a bracket secured to the frame 8 and carries at its outer end one of a set of change gears 128, (Figs. 27 and 4) through which the motion of the shaft 125 is imparted to the shaft 129 to which is secured a worm 130. The worm 130 meshes with and drives a worm wheel 131 which is rotatably mounted on the shaft 132 (Fig. 28) journalled in the frame.

The motion of the worm wheel 131 may be transmitted to the shaft 132 through the clutch 133 which is controlled by means of a hand lever 134 (Figs. 28 and 29) so as to bring its clutch teeth into engagement with the clutch teeth of a member 135, secured to the sleeve of the worm wheel 131. This clutch member 133 has a splined connection with the shaft 132 so that on movement of the clutch to the left from the position shown in Figure 28, the rotary motion of the worm wheel 131 is imparted to the shaft 132.

It should be noted that the clutch member 133 is integral with a spur gear 136 from which the motion imparted to the blank to compensate for the cradle roll is derived, as will be hereinafter described.

The shaft 132 (Figs. 4, 31 and 13) is journalled at its further end in a bracket secured to the frame 8 and has keyed to it a worm 137 which meshes with and drives the worm wheel 138 which has a splined connection with the shaft 139 (Figs. 11 and 13) and which, therefore, imparts to the shaft 139 a rotary motion. Keyed to the shaft 139, is a worm 140 that meshes with the worm wheel 118 secured to the cradle 10. By the means described a continuous rotary motion at a uniform velocity may be imparted to the cradle, thereby moving the tool relatively to the blank to be cut, to generate the tooth profiles.

*Mechanism for imparting to cradle its harmonic motion.*

As has previously been stated when it is desired to produce a tooth which extends in substantially one direction, a further relative motion of a harmonic nature is imparted between the tool and blank. In the embodiment of our invention, herein described, this added motion is imparted to the cradle. The means for imparting this added motion to the cradle in this machine will next be described.

Keyed to the shaft 14 (Figs. 9, 10 and 4), intermediate its length, as has already been described is a bevel pinion 80 which not only meshes with the gear 81 but with a bevel gear 141 secured to a shaft 142 which is journalled in the differential housing 143 secured to the frame 8, and which carries at its inner end a bevel pinion 144 forming one of a set of differential gears and driving through the other gears of this set the shaft 145, which is also journalled in the differential housing 143 and is connected by a clutch of any suitable type, such as shown at 146 with the shaft 145'. This shaft 145' is suitably journalled in the frame 8 and drives the shaft 147 through the bevel gearing 148.

The shaft 147 is suitably journalled in the frame 8. An eccentric sleeve 149 is secured to the shaft 147 adjacent one end. This sleeve 149 is journalled in the block 150 (Figs. 4, 11 and 12). Together the sleeve and block form the eccentric F. The block is slidably mounted in a slot 151 in a sleeve 152 which is slidable in a suitable opening in the frame 8, and which is suitably connected to the shaft 139 to which is keyed the worm 140 which meshes with and drives the cradle worm wheel 118 (Figs. 11 and 9). By the mechanism just described a variable motion of a simple harmonic nature may be imparted to the cradle. This added harmonic motion combined with the tool reciprocation and the blank rotation will produce a gear having teeth which extend in one direction. These teeth will be of substantially constant spiral angle or longitudinal tooth curvature and the tool clearance angle in cutting such teeth will be substantially constant.

It might be noted that the eccentric F imparts to the worm 140 a reciprocating motion and that, accordingly, the movement of the cradle worm wheel 118 and the worm 140 under actuation of the eccentric is that of a gear rolling on a rack. The splined connection between the worm wheel 138 and the shaft 139 permits of the combined reciprocating and rotary motion of the shaft 139 and the transmission of these combined motions to the worm wheel 118.

*Compensating motion for the eccentric because of the cradle roll.*

The main drive shaft 14 is fixed in space relative to the cradle 10 and it does not move with the cradle. Some means must be employed, therefore, in those drives whose elements move independently of the cradle to compensate for the cradle movement. Change gears might be used but these would require considerable calculation and a change of combination with each variation in the amount of roll. Preferably a differential is employed for this purpose. The differential has the advantage of permitting any suitable ratio gears to be employed while always maintaining the proper relation between the cradle and the eccentric movement. The differential moreover will always impart the exact compensating motion required and no approximation is necessary as would be the case, in many instances, where the calculated change gears would have fractional numbers of teeth and could only be approximated by gears having the nearest integral number of teeth.

In the drive to the eccentric F the movement of the cradle is compensated for by a bevel pinion 154 which is keyed to the sleeve 15 fixed to the cradle and which meshes with a bevel gear 155 secured to the differential housing 143 (Figs. 9, 10 and 4). By this means an additional motion is imparted to shaft 147 and to the eccentric thus compensating for the cradle movement.

*Compensating motion for the blank because of the cradle roll.*

Just as a compensating motion must be imparted to the eccentric because of the cradle roll, so a compensating movement must be imparted to the blank also because of this same cradle movement. While change gears might be used here also in order to impart the necessary compensating motion to the blank it is preferable for the reasons already given to employ a differential.

Figure 17:
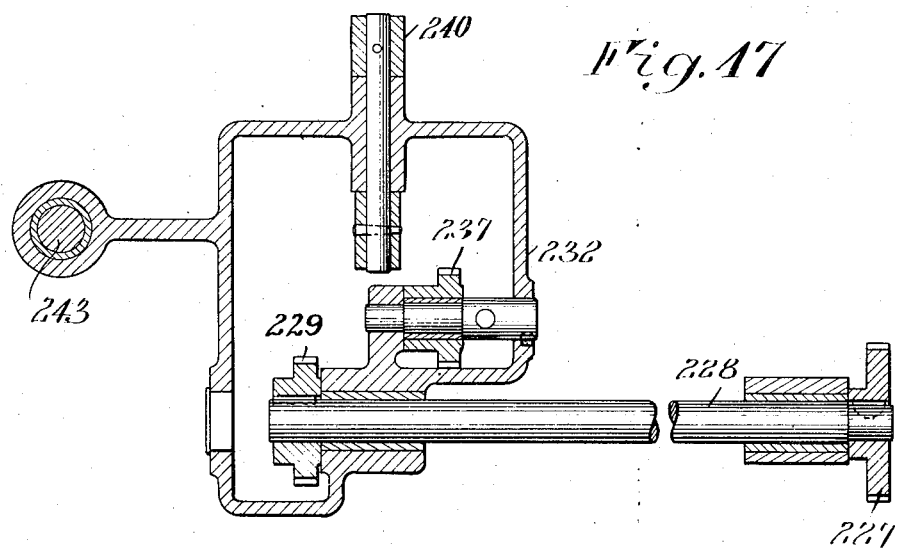
Fig. 17 is a detail sectional view showing one of the differentials and the connections between the main drive shaft, the drives for the cradle, and the drive for the blank.

The differential used is that shown in Figure 17 and the compensating motion is derived as follows: As has already been described the clutch member 133 (Figs. 4 and 28) has formed integral with it a spur gear 136. This gear 136 meshes with a spur gear 155 which has a long face so that regardless of the position of the clutch 133 on the shaft 132, motion of that shaft will be transmitted to the spur gear 155. The spur gear 155 is formed integral with a sleeve 156 (Figs. 28 and 64) which is provided with clutch teeth adapted to be engaged in the normal operation of the machine with the teeth of a clutch 157 which has a splined connection with the shaft 158 which is journalled in a suitable bracket connected to the frame 8 and which carries at its inner end one of a pair of bevel gears 159 (Figs. 4, 27 and 28) one member of which is secured to the shaft 160 which carries at its opposite end a bevel pinion 161 which meshes with and drives a bevel gear 162 which is keyed to the shaft 163 (Figs. 4, 24 and 33) which carries at its opposite end one of a set of differential ratio change gears 164 mounted in the change gear housing 164′ (Figs. 23, 24 and 33) through which is driven the shaft 165 (Figs. 4, 17 and 24) which drives the stub shaft 166, journalled in the frame 8, through the bevel gearing 167. This shaft 166 has keyed to it a spur pinion 168 which meshes with and drives the spur gear 169 (Figs. 4 and 17) which is fastened to the differential housing 85. Through the mechanism just described an added algebraic motion is imparted to the shaft 84 and through the gears 86 and 88 to the shaft 89 and thus to the blank, to compensate for the movement of the cradle 10.

The purpose of the clutch 157 (Figs. 28 and 64) is to permit hand adjustment or setting of the cradle without affecting the position of the blank. This may be done by withdrawing the clutch from engagement with the sleeve 156 of the spur gear 155, and rotating the cradle drive shaft 132 by hand, this shaft being provided with a hexagonal or other suitably shaped end portion for this purpose (Figs. 4 and 28).

*Cradle quick return drive.*

It is frequently desirable to move the cradle more rapidly than is possible with the comparatively slow generating drive mechanism, as, for example, when the operation of completely generating all the teeth of a blank has been completed and the cradle has reached the end of its roll, and it is desired to return the cradle to position for starting operation on a new blank. We have incorporated, therefore, in the present machine, mechanism for imparting to the cradle a rapid movement in either direction.

Figure 7:
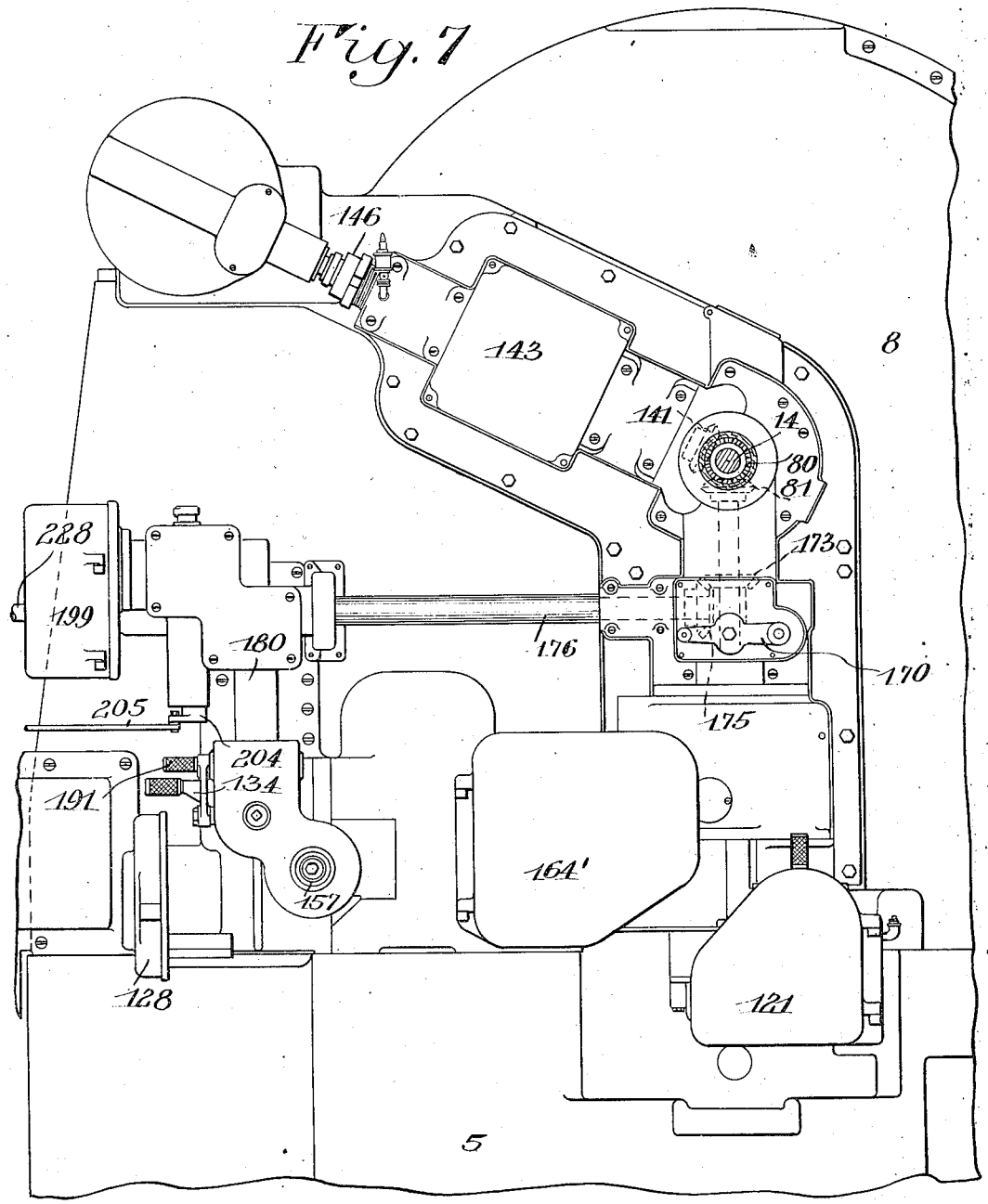
Fig. 7 is a partial rear elevation of the cradle support.

Keyed to the shaft 82, which is driven by the main clutch shaft 14 (Figs. 4 and 17) is a clutch member 170 provided with clutch teeth 171 and adapted to be moved into engagement with the clutch teeth 172 formed integral with the sleeve of a bevel gear 173 which is journalled on the shaft 82. The bevel gear 173 meshes with a bevel gear 175 (Figs. 4 and 7) which is keyed to the shaft 176 (Figs. 4, 7 and 30) which is mounted in a suitable bracket secured to the frame 8 and to which is keyed a bevel gear 178 that meshes with and drives a bevel gear 179 which is keyed to the shaft 180 to the lower end of which is secured a bevel gear 181 that is in continuous driving mesh with a pair of opposing bevel gears 182 (Figs. 4, 28 and 30). The bevel gears 182 are journalled on the shaft 132 which drives the cradle. Intermediate the two bevel gears 182 is a clutch member 183 which is provided with clutch teeth at either end for selective engagement with cooperating clutch teeth formed on the bevel gear 182. When the clutch member 183 is moved by the yoke 186 and the hand lever 187, which may be of any suitable or usual structure, into engagement with either of the bevel gears 182 a rapid rotary motion will be imparted to the shaft 132. By the mechanism just described the cradle can be moved rapidly in either direction. When the clutch 157 (Figs. 4 and 28) is in engaged position, this rapid movement of the cradle will be transmitted, from the shaft 132, through the spur gear 136, which is always in mesh with the long-faced spur gear 155, to the blank, the spur gear 155 forming part of the blank compensating mechanism already described. Thus the timed relation of the tool and blank movements may be maintained during the rapid cradle movement. It is oftentime desirable, however, to change the relation between the cradle and blank. When the clutch 157 is disengaged, the cradle 10 can be moved rapidly, through the mechanism just described, to change the cradle or tool setting relative to the blank. The double-faced clutch 183 and the cooperating bevel gears 182 permit of rapid movement of the cradle from one position to another in either direction.

To avoid any possibility that through an oversight the clutch 183 might be thrown while the clutch 138 is in engagement with the teeth of the worm wheel 131, that is, to avoid any possibility of an attempt to drive the cradle drive shaft 132 rapidly and slowly at the same instant a safety device should preferably be provided to prevent throwing of one of these clutches while the other is in engagement. One such safety device is shown in Figures 31 and 32. The hand lever 187 (Fig. 30) is provided with a spring pressed plunger 190 which is controlled by the hand grip 191 and may be engaged selectively in one of three apertures 192, 192' or 192'' formed in the side face of the frame or of a bracket secured thereto (Fig. 32). The hand lever 134 is also provided with a hand grip controlled spring pressed plunger of similar construction to that provided in the grip of the hand lever 187. This plunger (not shown) of the lever 134 may be engaged selectively in one of two apertures 193, or 193' formed in the face of the frame or the bracket secured thereto. A link 194 is secured to the lever 187 so as to move therewith. This link 194 is in the form of a hook at its outer end. When the lever 187 is in neutral position shown in Figures 32 and 28 the notch in the arm 194 registers with the aperture 193' and the lever 134 may be moved so as to engage the clutch 133 with the sleeve of the worm wheel 131, thereby permitting a slow rotational movement of the shaft 132 and of the cradle. When, however, the lever 187 is so moved as to engage its plunger with either of the apertures 192' or 192'' for engaging the clutch 183 with the clutch teeth of either of the bevel gears 182 to drive the cradle rapidly in either direction the arm 194 will be so moved as to cover up the aperture 193' and thereby prevent movement of the clutch lever 134. When on the other hand the lever 134 has been so moved that its plunger is seated in the aperture 193', the plunger on said lever will prevent movement of the arm 194 or of the lever 187. This safety device will absolutely prevent any accidental connection of the slow and rapid cradle drives at the same instant.

*Mechanism for slowly feeding the blank into depth.*

This machine can be used to rough or finish cut both gears and pinions. In the roughing operation, it is necessary to gradually feed the blank relatively to the tool until the teeth or tooth spaces have been cut to the desired depth. The mechanism for accomplishing this feed movement will next be described.

The shaft 176 (Figs. 4, 30 and 28) which carries the bevel gear 178 that imparts the rapid motion to the cradle shaft drive gears has secured to it also a spur gear 196, which, as will be hereinafter explained, imparts the drive for the rapid feed movement of the blank, and a spur gear 197 which forms one of a set of change gears 198 which drive the slow blank feed mechanism. This slow feed mechanism will be first described.

The motion of the shaft 176 is imparted through the change gears 198, which are mounted in the gear housing 199, to a shaft 200 (Figs. 4 and 43) which is journalled in a suitable bracket secured to the frame 8 and which has keyed to it a bevel gear 201 which meshes with and drives a bevel gear 202 which is keyed to a shaft 203 to the outer end of which is secured a crank member 204 connected by a pin 204' with a connecting rod 205. This rod 205 is connected to an oscillatable pawl carrier 206 on which is pivotably mounted a pawl 207 (Figs. 4, 44 and 45) which is adapted to engage the teeth of a ratchet wheel 208 which is secured to a shaft 209 that is suitably journalled in a bracket 210 secured to the frame 8 and which has keyed to its lower end a worm 211 that meshes with and drives a worm wheel 212 which is journalled on a sleeve 213 (Figs. 49) which has a frictional drive engagement with the shaft 214 through a friction clutch 215, one member of which 216 is keyed to the sleeve 213 and the other member of which is threaded on the shaft 214. The worm wheel 212 may be connected to the sleeve 213 by the clutch 217, thus imparting its motion to the shaft 214. This shaft 214 for convenience in construction is made in two parts suitably connected at 218, (Figs. 4, 37, 38 and 49). The outer portion of this shaft is journalled in a suitable bracket on the base 5. To this shaft 214 is keyed a worm 219 that meshes with the worm wheel segment 220 which is secured to the feed rail 66.

The pawl carrier 206 is journalled on a sleeve 221 (Fig. 44) which is secured to the bracket 210 and which is concentric with the shaft 209. This sleeve also forms a bearing for the ratchet wheel 208 which is keyed to the shaft 209 and for an adjustable guard carrier 222 to which is fixed the guard 223. This guard is employed to control the amount of movement of the ratchet wheel 208, with each stroke of the connecting rod 205. By properly setting the guard plate, the pawl can be made to move the ratchet wheel one, or two more tooth spaces, each time the pawl engages it under actuation of the rod 206. The guard carrier can be swung about the sleeve 221 for adjustment of the guard and may be secured in any adjusted position by the T-bolt 224 which is adapted to engage in a suitably shaped slot 225 formed therefor in the bracket 210. For convenience in setting the guard plate, a scale 226 is provided on the bracket 210 which registers against an index mark on the guard carrier. The guard may be thus set so that the pawl will move the ratchet wheel any desired number of tooth spaces with each stroke of the connecting rod 205. When the guard carrier is set at zero, the pawl will run idle and no feed movement will be transmitted to the blank carrier. The setting of the pawl controls the amount of feed of the blank at each stroke of the rod 205.

By the means described a slow feed movement is imparted to the blank carrier to feed the blank into depth.

*Rapid feed mechanism.*

For quickly withdrawing the blank from cutting position after the teeth have been cut to the desired depth or for quickly returning the blank into cutting position where for any reason it has been withdrawn, a rapid feed mechanism is provided. This mechanism is also actuated from the shaft 176 (Figs. 4 and 30). The spur gear 196 mounted on the shaft 176 meshes with and drives a spur gear 227 (Figs. 4 and 48) which is keyed to the shaft 228 (Figs. 41, 46 and 47) which carries at its opposite end a spur gear 229 which meshes with and drives a spur gear 230 keyed to the shaft 231, which is suitably journalled in a bracket 232 secured to the frame 8 and to the other end of which is keyed a spur gear 233. These spur gears 230 and 233 together with the shaft 231 form part of a reversing mechanism which may be of any suitable type, the type illustrated being that shown and described in the U. S. Patent No. 1,203,608— Gleason et al—November 7, 1916. The spur gear 230 meshes with a spur gear 234 which is journalled on the shaft 235, while the spur gear 233 drives the spur gear 236 also journalled on the shaft 235 through the idler 237. A reversing clutch 238 which may be operated by a clutch lever 240 of any suitable construction, and which has a splined connection with the shaft 235 serves to transmit the rotation of the shaft 231 selectively either through the spur gears 230 and 234 or through the spur gears 233, the idler 237 and the spur gear 236, to the shaft 235.

The arrangement is such that by properly positioning the clutch member 238 the shaft 235 may be driven in either direction. Keyed to one end of the shaft 235 is a bevel pinion 241 (Figs. 4, 8, and 42) which meshes with and drives a bevel gear 242 which is fastened to a shaft 243 that is journalled in the frame 8 or suitable brackets secured thereto. To this shaft 243 is keyed a worm 244 (Figs. 4, 49 and 50) which is in mesh with a worm wheel 245. This worm wheel 245 like the worm wheel 212 is journalled on the sleeve 213. The clutch 217, already mentioned, which has a splined connection with the sleeve 213 serves to selectively connect either of these worm wheels 212 or 245 to the sleeve 213, thus transmitting the rotation of the same through the friction clutch 215 to the shaft 214, thus moving the blank carrier about the axis Z of the bearing 62.

By moving the clutch 217, then, to the right or left, respectively, from the position shown in Figure 49, the blank may be slowly fed into depth or rapidly withdrawn or returned to cutting position. If the clutch 217 remains in neutral position, as when finish cutting a blank, no feed movement will take place. The direction of the rapid movement will depend upon the position of the reversing clutch 238 (Figs. 4 and 46).

The friction clutch 215 (Fig. 49) is provided as a safety device so that when the blank has reached the limit of its inward feed movement, determined by the position of the screw 246, (Fig. 37), which is adapted to contact with an end wall 247 of the base 5, no further feed will take place.

*Tool clapping mechanism.*

One feature of the machine constructed according to the preferred embodiment of this invention is the mechanism for withdrawing and returning the tool from and to its operative position at each end of the cutting stroke. This clapper mechanism is more fully described and claimed in the copending application of M. H. Johanson, Serial No. 78,359, filed December 30, 1925.

The mechanism, however, will be briefly described here. The crank member 26 (Figs. 9, 55 and 56), as has already been described has formed on its periphery a cam slot 35, which cam slot is utilized to effect the clapping operation. Slidably mounted in a sleeve 256 (Figs. 9, 56 and 58), secured to the arm 42 is a rod 257 which carries at one end a roller 258 which rides in the cam slot 35 of the crank member 26. The rod 257 has a flexible connection by means of the springs 259 (Fig. 58) with a sleeve 260 to which are secured a pair of racks 261 which mesh with a pair of pinions 262 which are formed integral with sleeves 263 which are journalled in the sleeve member 256.

Each sleeve 263 is provided at one end with a socket 264 which is adapted to receive the projecting portion 265 of one member 266 of a universal joint connection 267 between the sleeve and the telescoping shaft 268 (Figs. 5, 6, 9 and 56). The universal joint member 266 may be secured to either sleeve member 263 by the bolt 269, both sleeves 263 being suitably bored to receive this bolt.

The telescoping shaft 268 is connected by another universal joint 270 (Figs. 5, 6 and 9) with a shaft 271 (Fig. 60) which is journalled in the clapper block support 56 and to which is fastened the bevel gear 272 which meshes with and drives the bevel gear 273 which is secured to the shaft 274, which is journalled in said clapper block support and carries a spur gear 275 that meshes with a movable rack 276 (Figs. 60, 61 and 62). This movable rack 276 slides in a groove provided therefor in the clapper block support 251. The rack 276 meshes with a segmental spur gear 277 (Figs. 61, 62, and 63) to which is secured the pin 278 which is fastened to a block 279 which has a sliding fit in a slot 280 in the clapper block 54.

The arrangement is such that the tool is swung to and from operative position by the reciprocating movement of the rod 257 under actuation of the cam 26, the reciprocating movement of the rod being transmitted through one rack 261, one pinion 262, the telescoping shaft 268, the bevel gears 273 and 274, the spur gear 275, and the rack 276 to the segmental spur gear 277 which oscillates the block 279 and swings the clapper block 54 about its pivot 55.

The two racks 261 and the two pinions 262 are provided, because it may be desired to cut on either stroke of the tool, so as to permit clapping of the tool at the proper point whichever stroke is used. By connecting the universal joint member 266 with one or the other sleeve 263, this clapping movement will be accomplished at the proper point of the cutting stroke, as will be readily understood.

A toggle member 282 (Figs. 61 and 62) pivotally mounted on the rack 276 is adapted to cooperate with a recess 283 formed on the clapper block to maintain the clapper block and tool in cutting position, with the projection 284 on said clapper block firmly seated against the lug 285 secured to the clapper block support. When the rack is in the position shown in Fig. 61, the clapper block is rigidly held between the toggle 282 and the lug or seat 285, the tool being thus locked in cutting position. The rack 276 will occupy the position shown in Fig. 61 when the roller 258 is in that portion of the cam slot 35 marked "Tool cutting" (Fig. 57). As soon, however, as the rack 276 begins to move through the rotation of the spur gear 275 to withdraw the tool from cutting position, the spring pressed plunger 286 (Fig. 62), which is housed in the clapper block support 56, will force the toggle member 282 out of locking position and permit pivotal movement of the clapper block about its pivot 250. The tool is shown completely withdrawn in Fig. 62.

A layout of the cam 35 is shown in Figure 57. The provision of a cam slot 35 in the crank disc 26, itself, insures accurate timing of the tool stroke with the tool clapping mechanism. The tool will thus always be in cutting position on the cutting stroke of the head slide 29 and connecting rod 30 and out of cutting position on the return stroke of the rod and head slide. From the description of the clapping mechanism just given it will be apparent how the tool is swung to and withdrawn from cutting position.

*Operation.*

Figure 6:
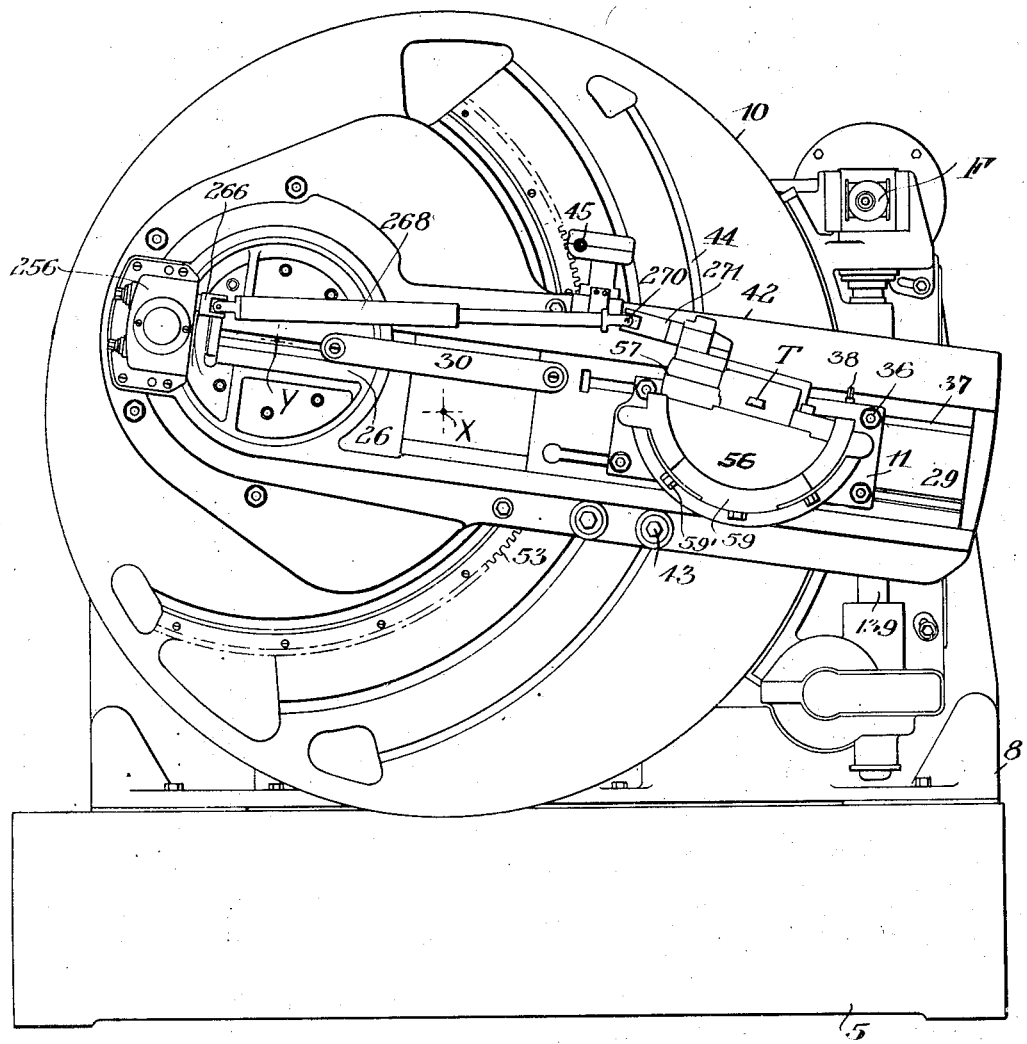
Fig. 6 is a front elevation of the cradle and tool slide.

In the cutting a gear on a machine constructed according to the embodiment of our invention herein described the arm 42 is first moved to the desired position to offset the tool the required amount from the blank apex (Fig. 6) by turning the shaft 45 (Figs. 52, 53 and 54). The clapper block support 56 is then adjusted on the tool head to bring the tool into proper cutting position with the required clearance (Figs. 6 and 60). The cradle 10 may then be moved by hand or by power by rotating the shaft 132 after the clutch 157 has been thrown out of engagement (Figs. 4, 28) to bring the arm 42 and the tool T into position where when the machine is started up the tool will begin immediately to cut into the blank. This adjustment is merely for convenience and saving in time. The blank carrier will be swung about the axis Y by rotating the shaft 63 (Figs. 35 and 36) to bring the blank into proper cutting position. If a gear is to be cut the pinion head carrier 7 will be removed from the machine; if a pinion is to be cut the gear head carrier 6 may be swung out of the way and the pinion blank carrier moved into cutting position, shown in Figure 5. The work-head will be adjusted lengthwise of the head carrier, by rotating the shaft 72 (Figs. 14 and 35) so as to bring the cone apex of the blank into proper position for a bevel gear into coincidence with the apex or center X of the imaginary crown gear.

The tool T will be secured to the tool head to cut, as may be desired, either on the forward or return stroke of the connecting rod 30, and the universal joint member 267 (Figs. 9 and 59) will be secured to the proper pinion 262 to insure clapping of the tool at the proper point in the stroke. If the gear is being rough cut, the clutch 217 (Figs. 4 and 49) will be moved into engagement with the clutch teeth of the worm 212, whereby a slow feed movement may be imparted to the blank. If the blank is being finished cut, the clutch 217 will be left in neutral position, as shown in Figures 4 and 49. If the gear is to be generated, the clutch 127 (Figs. 4, 26 and 27) will be engaged with the clutch teeth of one or the other of the gears 124, whereby the generating motion will be imparted to the cradle in the desired direction, this machine being capable of generating either on the up-roll or down-roll of the cradle, and the clutch 133 (Figs. 4 and 28) will be thrown to the left (Fig. 28) to impart the slow rotational movement to the cradle. If the gear is not to be generated the clutch 127 will be left in neutral position shown in Figures 4, 26 and 27.

The longitudinal curvature of the teeth may be produced, either by the reciprocating movement of the tool in its offset path combined only with the continuous rotation of the blank, or by these two movements in combination with the additional harmonic motion of the cradle under actuation of the eccentric F. If this last motion is to be employed the clutch 146 (Figs. 4, 9 and 10) will be engaged, otherwise this clutch will be thrown out of engagement.

Upon starting up the motor or other source of power, the tool will be reciprocated across the face of the continuously rotating blank, while if the gear is being generated a slow rotational movement is imparted to the cradle and the tool mounted thereon. If the additional harmonic motion is being employed, the cradle will have an oscillating movement under actuation of the eccentric. This movement may be used alone, as where the gear is produced without a generating movement, or in combination with the cradle slow rotation, as where the tooth profiles are to be generated. If the gear is being rough cut a slow feed movement will be imparted to the blank simultaneously with the other motions just described. When the blank has been completed, the quick feed mechanism can be thrown into operation through engagement of the clutch 238 (Figs. 4 and 46) with either of the gears 234 or 236 and the blank thus swung out of cutting position. At the same time the cradle can be returned to initial position by the quick return mechanism on engagement of the clutch 183 (Figs. 4 and 28) and disengagement of the clutch 133.

Two means are provided in this machine for controlling the location of the tooth bearing in a pair of mating gears. One is the eccentric which may be rotated by hand from the shaft 145' (Figs. 4 and 9) after the clutch 146 has been disengaged from its driving connection with the shaft 145; the other is the adjustment of the tool head 32 along the tool slide 29 (Figs. 6 and 9). Where the gear to be cut is to be produced without the added harmonic motion, the tool head adjustment is employed to secure a properly localized bearing. Where the gear is to be cut with the added harmonic motion, either the adjustment of the tool head or the adjustment of the eccentric may be employed for this purpose.

While we have described our invention with particular reference to the cutting of generated bevel gears, it is to be understood that this invention is applicable to the production of other types of gears also, as cylindrical and hypoid, whether generated or non-generated.

While we have shown a single tool only, it is to be understood that it is within contemplation of our invention to employ a plurality of tools. The tool or tools moreover may be so constructed as to cut in a tooth space only, such as is the tool shown, or they may be of such structure as to straddle a tooth being cut and cut on the adjacent sides of such tooth simultaneously. The tool or tools furthermore may be straight sided or of curved profile, and if curved, the curvature may be of any desired form, as involute, spherical, etc. Instead of a planing tool, moreover, a suitable grinding tool may be employed.

In general it may be said that, while we have described our invention in connection with specific structures and in connection with specific uses for such structures, it is to be understood that the invention is capable of various further modifications and uses and that the structures may be modified without departing from the intent of the invention or the scope of the following claims and that this application is intended to cover any adaptations or embodiments, following in general, the principles of the invention and including such departures from the present disclosure as come within known or customary practise in the gear art and may be applied to the essential features hereinbefore set forth and as fall within the scope of the invention or the limits of the appended claims.

Having thus described our invention, what we claim is:

1. The method of producing gears, which consists in moving the tool across the face of the blank in a straight line offset from the blank apex while imparting a continuous rotary movement to the blank.

2. The method of producing gears, which consists in moving the tool across the face of the blank in a straight line offset from the blank apex, while rotating the blank continuously on its axis and simultaneously imparting an additional relative movement between the tool and blank to generate the tooth profiles.

3. The method of producing gears, which consists in moving a tool at a variable velocity across the face of the blank in a straight line offset from the blank apex, while imparting a continuous rotary movement to the blank.

4. The method of producing gears, which consists in moving a tool at a variable velocity across the face of the blank in a straight line offset from the blank apex, while rotating the blank continuously on its axis and simultaneously imparting an additional relative movement between the tool and blank to generate the tooth profiles.

5. The method of producing gears which consists in reciprocating a tool across the face of a gear blank at a variable velocity while rotating the blank on its axis at a uniform velocity and simultaneously imparting an additional relative movement between tool and blank at a variable velocity.

6. The method of producing gears, which consists in reciprocating a tool across the face of a gear blank at a variable velocity of a harmonic nature, while rotating the blank on its axis at a uniform velocity and simultaneously imparting an additional relative movement between the tool and blank at a variable velocity also of a harmonic nature.

7. The method of producing gears which consists in reciprocating a tool across the face of a gear blank at a variable velocity in a straight line offset from the apex of the blank, while rotating the blank on its axis at a uniform velocity and simultaneously imparting an additional relative movement between the tool and blank at a variable velocity.

8. The method of producing gears which consists in reciprocating a tool in a straight line across the face of a gear blank at a variable velocity of a harmonic nature, while rotating the blank on its axis at a uniform velocity and simultaneously imparting an additional relative movement between the tool and blank at a variable velocity also of a harmonic nature, but of a different frequency from the first harmonic motion.

9. The method of producing gears which consists in reciprocating a tool across the face of a gear blank at a variable velocity of a harmonic nature and in a straight line offset from the apex of the blank rotating the blank on its axis at a uniform velocity and simultaneously imparting an additional relative movement between the tool and blank at a variable velocity also of a harmonic nature.

10. The method of producing gears which consists in reciprocating a tool at a variable velocity of a harmonic nature in a straight line offset from the apex of the blank, rotating a blank on its axis at a uniform velocity and simultaneously imparting an additional relative movement between the tool and blank at a variable velocity also of a harmonic nature but of a different frequency from the first harmonic motion.

11. The method of producing gears which consists in reciprocating a tool at a variable velocity across the face of a gear blank in a path oblique to the blank axis, while rotating the blank continuously on its axis at a uniform velocity and simultaneously imparting an additional relative movement between the tool and blank also at a variable velocity.

12. The method of producing gears which consists in reciprocating a tool at a variable velocity across the face of a gear blank, rotating the blank continuously and at a uniform velocity on its axis and simultaneously imparting an additional relative movement at a variable velocity between the tool and blank about the apex of the blank.

13. The method of producing gears which consists in reciprocating a tool across the face of a gear blank at a variable velocity, while rotating the blank continuously on its axis at a uniform velocity and imparting an additional relative movement between the tool and blank at a uniform velocity to generate the tooth profiles and simultaneously imparting a further relative movement at a variable velocity between tool and blank.

14. The method of producing gears which consists in reciprocating a tool at a variable velocity across the face of a gear blank in a straight line oblique to the blank axis, while rotating the blank continuously on its axis at a uniform velocity, imparting an additional relative movement between tool and blank at a uniform velocity to generate the tooth profiles and simultaneously a further relative movement at a variable velocity between the tool and blank.

15. The method of producing gears which consists in reciprocating a tool across the face of a gear blank at a variable velocity and in a straight line offset from the apex of the blank, while rotating the blank continuously on its axis at a uniform velocity and imparting an additional relative movement between tool and blank at a uniform velocity to generate the tooth profiles and simultaneously imparting a further relative movement at a variable velocity between tool and blank.

16. The method of producing gears which consists in reciprocating a tool across the face of a gear blank at a variable velocity and in a straight line offset from the apex of the blank, while rotating the blank continuously on its axis at a uniform velocity, imparting an additional relative movement between tool and blank about the apex of the blank to generate the tooth profiles and simultaneously imparting a further relative movement between tool and blank at a variable velocity also about the apex of the blank.

17. The method of producing gears which consists in reciprocating a tool across the face of a gear blank at a variable velocity of a harmonic nature, while rotating the blank on its axis at a uniform velocity and simultaneously imparting an additional relative movement at a variable velocity also of a harmonic nature between tool and blank about the apex of the blank.

18. The method of producing gears which consists in reciprocating a tool across the face of a gear blank in a straight line offset from the apex of the blank at a variable velocity of a harmonic nature, rotating the blank on its axis at a uniform velocity, imparting between tool and blank an additional relative movement at a uniform velocity and simultaneously producing a further relative movement between tool and blank at a variable velocity also of a harmonic nature.

19. The method of producing gears which consists in reciprocating a tool in a straight line across the face of a gear blank and at a variable velocity, while rotating the blank continuously on its axis at a uniform velocity and simultaneously imparting between tool and blank a combined relative rotary and oscillatory motion about the apex of the blank, said oscillatory motion being at a variable velocity.

20. The method of producing gears which consists in reciprocating a tool in a straight line across the face of a gear blank and at a variable velocity, of a harmonic nature while rotating the blank continuously on its axis at a uniform velocity and simultaneously imparting between the tool and blank a combined relative rotary and oscillatory motion about the apex of the blank, said oscillatory motion being at a variable velocity of a harmonic nature but of a different frequency from the first harmonic motion.

21. The method of producing gears which consists in reciprocating a tool across the face of a gear blank at a variable velocity and in a straight line offset from the apex of the blank, while rotating the blank continuously on its axis at a uniform velocity and simultaneously imparting between tool and blank a combined relative rotary and oscillatory motion about the apex of the blank, said oscillatory motion being at a variable velocity.

22. The method of producing gears which consists in reciprocating a tool across the face of a gear blank at a variable velocity of a harmonic nature and in a straight line offset from the apex of the blank, while rotating the blank continuously on its axis at a uniform velocity and simultaneously imparting between tool and blank a combined relative rotary and oscillatory motion about the apex of the blank, said oscillatory motion being at a variable velocity of a harmonic nature but of a different frequency from the first harmonic motion.

23. In a machine for producing gears, a blank support, a tool, means for positioning the tool and blank support in operative relation, means for moving the tool at a variable velocity across the face of the blank carried by said support, and means for simultaneously rotating the blank on its axis, and means for simultaneously imparting an additional relative movement at a variable velocity between tool and blank.

24. In a machine for producing gears, a blank support, a tool, means for positioning the tool and blank support in operative relation, means for moving the tool at a variable velocity across the face of the blank, means for simultaneously imparting to the blank a continuous rotary motion and means for simultaneously imparting an additional relative movement between tool and blank about an axis intersecting the axis of the blank and at a variable velocity.

25. In a machine for producing gears, a blank support, a tool support, a slide on said tool support, means for adjusting said slide so that it will on actuation move in a straight line offset from the blank apex, means for reciprocating said slide, means for imparting a continuous rotary indexing movement to the blank and means for simultaneously imparting an additional relative movement between tool and blank to generate the tooth profiles.

26. In a machine for producing gears, a blank support, a tool support, a slide on said tool support, means for adjusting said slide so that it will on actuation move in a straight line oblique to the blank axis, means for reciprocating said slide, means for imparting a continuous rotary indexing movement to the blank, and means for imparting simultaneously an additional relative generating movement between tool and blank.

27. In a machine for producing gears, a blank support, a tool, means for positioning the tool and blank support in operative relation, means for moving the tool across the face of the blank in a straight line at a variable velocity, means for simultaneously imparting a continuous rotary movement to the blank support on an axis coinciding with the axis of the blank, and means for simultaneously imparting an additional relative movement at a variable velocity between tool and blank.

28. In a machine for producing gears, a blank support, a tool, means for positioning the tool and blank support in operative relation, means for moving the tool across the face of the blank in a straight line offset from the blank apex and at a variable velocity, means for simultaneously imparting a continuous rotary movement to the blank support on an axis coinciding with the axis of the blank and means for imparting an additional relative movement at a variable velocity between tool and blank support.

29. In a machine for producing gears, a blank support, a tool, means for positioning the tool and blank support in operative relation, means for moving the tool across the face of the blank, in a straight line at a variable velocity of a harmonic nature, means for simultaneously rotating the blank support on an axis coinciding with the axis of the blank, and means for imparting an additional relative movement at a variable velocity, also of a harmonic nature but of a different frequency from the first harmonic motion, between tool and blank support.

30. In a machine for producing gears, a blank support, a tool, means for positioning the tool and blank support in operative relation, means for moving the tool across the face of the blank in a straight line at a variable velocity and means for simultaneously rotating the blank support on an axis coinciding with the axis of the blank and for imparting an additional relative movement at a variable velocity between tool and blank about an axis intersecting the axis of the blank.

31. In a machine for producing gears, a blank support, a tool, means for positioning the tool and blank support in operative relation, means for moving the tool across the face of the blank in a straight line offset from the blank apex at a variable velocity, means for simultaneously rotating the blank support on an axis coinciding with the axis of the blank and means for imparting an additional relative movement at a variable velocity between tool and blank about an axis intersecting the axis of the blank.

32. In a machine for producing gears, a blank support, a tool, means for positioning the tool and blank support in operative relation, means for moving the tool across the face of the blank in a straight line at a variable velocity and means for simultaneously and in timed relation with said tool movement imparting a continuous rotary motion to the blank support on an axis coinciding with the axis of the blank, moving the tool and blank relatively to each other to generate the tooth profiles and imparting a further relative movement between tool and blank at a variable velocity.

33. In a machine for producing gears, a blank support, a tool, means for positioning the tool and blank support in operative relation, means for moving the tool across the face of the blank in a straight line offset from the blank apex and at a variable velocity and means for simultaneously and in timed relation with said tool movement imparting a continuous rotary motion to the blank support on an axis coinciding with the axis of the blank, moving the tool and blank relatively to each other to generate the tooth profiles and imparting a further relative movement at a variable velocity between tool and blank.

34. In a machine for producing gears, a blank support, a tool, means for positioning the tool and blank support in operative relation, means for moving the tool across the face of the blank in a straight line at a variable velocity, means for imparting to the blank support a continuous rotary motion on an axis coinciding with the axis of the blank and means for simultaneously and in timed relation with said tool and blank movements, moving the tool and blank relative to each other about the apex of the blank to generate the tooth profiles and means for imparting a further relative movement at a variable velocity between tool and blank, also about the apex of the blank.

35. In a machine for producing gears, a blank support, a tool, means for positioning the tool and blank support in operative relation, means for moving the tool across the face of the blank at a variable velocity and in a straight line offset from the blank apex, means for imparting to the blank support a continuous rotary motion on an axis coinciding with the axis of the blank and means for simultaneously and in timed relation with said tool and blank movements, moving the tool and blank relatively to each other about the apex of the blank to generate the tooth profiles and means for imparting a further relative movement at a variable velocity between tool and blank also about the apex of the blank.

36. In a machine for producing gears, a blank support, means for adjusting the blank support into proper cutting position, a frame, an arm pivotally mounted in a suitable bearing in said frame for adjustment about an axis offset from the blank apex when in cutting position, a slide reciprocable on said arm, a tool head adjustable on said slide longitudinally of the path of movement thereof, a tool carried by said head, means for reciprocating said slide on said arm and means for simultaneously imparting to the blank support a continuous rotary motion on an axis coinciding with the axis of the blank.

37. In a machine for producing gears, a rotatable blank support, a tool support, a cradle upon which one of said supports is mounted, means for positioning the tool and blank supports in operative relation, an arm adjustable on said tool support on an axis offset from the axis of the cradle, a tool reciprocably mounted on said arm, means for reciprocating the tool, means for imparting to the blank support a continuous rotary motion on an axis coinciding with the axis of the blank and means for simultaneously imparting to the cradle a translatory movement on an axis intersecting the axis of the blank.

38. In a machine for producing gears, a rotatable blank support, a tool support, a cradle upon which one of said supports is mounted, means for positioning the tool and blank supports in operative relation, an arm adjustable on said tool support on an axis offset from and parallel to the axis of the cradle, a tool reciprocably mounted on said arm, means for reciprocating the tool, means for imparting to the blank support a continuous rotary motion on an axis coinciding with the axis of the blank and means for simultaneously imparting to the cradle a translatory movement about the apex of the blank.

39. In a machine for producing gears, a blank support, a tool support, a frame, a cradle, in which one of said supports is movably mounted on said frame, a tool carried by said tool support, means for imparting a reciprocatory movement at a variable velocity to said tool, and means for simultaneously and in timed relation with said tool reciprocation imparting a continuous rotary movement to the blank support on an axis coinciding with the axis of the blank and an oscillatory movement at a variable velocity to said cradle.

40. In a machine for producing gears, a rotatable blank support, a tool support, a frame, a cradle on which one of said supports is movably mounted on said frame, a tool carried by the tool support, means for reciprocating the tool in a straight line across the face of the blank and at a variable velocity, means for rotating the blank support continuously on an axis coinciding with the axis of the blank, means for imparting a continuous rotary movement to the cradle and means for simultaneously and in timed relation with the aforesaid movements, imparting an additional relative movement at a variable velocity between tool and blank.

41. In a machine for producing gears, a rotatable blank support, a tool support, a frame, a cradle on which one of said supports is movably mounted on said frame, a tool carried by the tool support, means for reciprocating the tool across the face of the blank in a straight line offset from the blank apex and at a variable velocity, means for rotating the blank support continuously on an axis coinciding with the blank, means for imparting a continuous rotary movement to the cradle and means for simultaneously and in timed relation with the aforesaid movements, imparting an additional relative movement at a variable velocity between tool and blank.

42. In a machine for producing gears, a rotatable blank support, a tool support, a frame, a cradle, on which one of said supports is mounted movably on said frame, means for imparting a reciprocatory movement at a variable velocity to the tool carried by said tool support, means for imparting a continuous rotary motion to the blank support on an axis coinciding with the axis of the blank, means for imparting an oscillatory movement at a variable velocity to the cradle, and means for simultaneously and in timed relation with the aforesaid movements, imparting an additional relative movement between tool and blank to generate the tooth profiles.

43. In a machine for producing gears, a rotatable blank support, a tool support, a frame, a carrier movably mounted on said frame and on which one of said supports is mounted, a main drive shaft, means actuated by rotation of said main drive shaft to impart a reciprocatory movement at a variable velocity to the tool carried by said tool support, a continuous rotary motion to the blank support on an axis coinciding with the axis of the blank, a translatory movement to the carrier and an additional relative movement at a variable velocity between the tool and blank supports.

44. In a machine for producing gears a rotatable blank support, a tool support, a frame, a cradle movably mounted on said frame, adapted to carry one of said supports, means for simultaneously imparting a combined rotary and oscillatory movement to said cradle, and means for imparting in timed relation with the cradle movement a reciprocatory movement at a variable velocity to the tool carried by said tool support and a continuous rotary motion to the blank support on an axis coinciding with the axis of the blank.

45. In a machine for producing gears, a rotatable blank support, a tool support, a frame, a cradle movably mounted on the frame, and adapted to carry one of said supports, a cradle drive shaft, a worm gear secured to said cradle, a worm secured to said shaft meshing with the worm gear, means for imparting to said shaft a rotary motion and means for simultaneously reciprocating said shaft longitudinally of its axis and means for simultaneously and in timed relation with said shaft movements imparting a reciprocatory movement to the tool and rotary movement to the blank support on an axis coinciding with the axis of the blank.

46. In a machine for producing gears, a rotatable blank support, a tool support, a frame, a cradle movably mounted on the frame, and adapted to carry one of said supports, a cradle drive shaft, gearing operatively connecting the cradle and cradle drive shaft, means for imparting to said shaft a rotary motion, means for simultaneously reciprocating said shaft at a variable velocity longitudinally of its axis and means for simultaneously and in timed relation with said shaft movements imparting a reciprocatory movement at a variable velocity to the tool carried by the tool support and a rotary movement to the blank support on an axis coinciding with the axis of the blank.

47. In a machine for producing gears, a rotatable blank support, a tool support, a frame, a carrier, on which one of said supports is movably mounted on the frame, a main drive shaft mounted coaxially of said carrier, means actuated by rotation of said main drive shaft for imparting a translatory movement to said carrier on its axis, a reciprocatory motion to the tool carried by the tool support and a continuous rotary motion to the blank support on an axis coinciding with the axis of the blank and compensating mechanism for maintaining the timed relation of said blank rotation and tool reciprocation during the translatory movement of said carrier.

48. In a machine for producing gears, a rotatable blank support, a tool support, a frame, a carrier on which one of said supports is movably mounted on the frame, a main drive shaft mounted coaxially of said carrier, means actuatable by rotation of said main drive shaft for imparting selectively to said carrier a translatory movement at different speeds and in different directions and means also actuatable by rotation of said main drive shaft for imparting a reciprocatory movement to said tool and a continuous rotary motion to said blank support on an axis coinciding with the axis of the blank.

49. In a machine for producing gears, a rotatable blank support, a tool support, a frame, a carrier, on which one of said supports is movably mounted on the frame, a main drive shaft mounted coaxially of said carrier, means actuatable by rotation of said main drive shaft for imparting selectively to said carrier a translatory movement at different speeds and in different directions, means actuated by rotation of said shaft for imparting a reciprocatory movement to the tool carried by said tool support and a continuous rotary motion to a blank support on an axis coinciding with the axis of the blank and in timed relation with the tool and carrier movements and compensating means for maintaining the timed relation of said blank rotation and tool reciprocation during the movement of said carrier.

50. In a machine for producing gears, a rotatable blank support, a tool support, a frame, a carrier, on which one of said supports is movably mounted on the frame, a main drive shaft mounted coaxially of said carrier, means actuatable by rotation of said main drive shaft for imparting selectively to said carrier a translatory movement at different speeds and in different directions, means actuatable by rotation of said shaft for imparting a reciprocatory movement to the tool carried by the tool support and a continuous rotary motion to the blank support on an axis coinciding with the axis of the blank and in timed relation with the tool and carrier movements and means for moving the carrier independently of the means which impart to it its translatory movement to adjust the carrier and the support carried thereby relatively to the other support.

51. In a machine for producing gears, a rotatable blank support, a tool support, a frame, a carrier, on which one of said supports is movably mounted on the frame, a main drive shaft mounted coaxially of said carrier, means actuated by rotation of said shaft for imparting a reciprocatory movement to the tool carried by said tool support and continuous rotary motion to the blank support on an axis coinciding with the axis of the blank, means actuatable by rotation of said shaft to impart selectively to said carrier a translatory movement at different speeds and in different directions, compensating mechanism for maintaining the timed relation of said blank rotation and tool reciprocation during the translatory movement of said carrier and means for adjusting said carrier and the support carried thereby relative to the other support independently of said compensating mechanism.

52. In a machine for producing gears, a rotatable blank support, a tool support, a frame, a rotatable cradle, on which one of said supports is movably mounted on the frame, means for imparting a reciprocatory movement to the tool carried by said tool support and in timed relation therewith a continuous rotary motion to the blank support on an axis coinciding with the axis of the blank, means for simultaneously moving said cradle on its axis and compensating mechanism for maintaining the timed relation of said tool and blank movements during the translation of said cradle.

53. In a machine for producing gears, a rotatable blank support, a tool support, a frame, a carrier, on which one of said supports is movably mounted on the frame, means for imparting in timed relation a rotary movement to the blank support on an axis coinciding with the axis of the blank and a reciprocatory movement at a variable velocity to the tool carried by the tool support, means for simultaneously imparting an oscillatory movement at a variable velocity to said carrier and compensating mechanism for maintaining the timed relation of said tool reciprocation and blank rotation during the oscillation of said carrier.

54. In a machine for producing gears, a rotatable blank support, a tool support, a frame, a carrier, on which one of said supports is movably mounted on the frame, means for imparting in timed relation a rotary movement to the blank support on an axis coinciding with the axis of the blank and a reciprocatory movement at a variable velocity to the tool carried by said tool support, and means for simultaneously imparting a reciprocatory movement at a variable velocity to said carrier.

55. In a machine for producing gears, a rotatable blank support, a tool support, a frame, a carrier, on which one of said supports is movably mounted on the frame, means for imparting in timed relation a rotary movement to the blank support on an axis coinciding with the axis of the blank and a reciprocatory movement at a variable velocity to the tool carried by said tool support, means for simultaneously imparting a reciprocatory movement at a variable velocity to said carrier and compensating mechanism for maintaining the timed relation of said tool and blank movements during the translation of said carrier.

56. In a machine for producing gears, a rotatable blank support, a tool support, means for positioning the tool and blank supports in operative relation, means for imparting in timed relation a reciprocatory movement to said tool and a continuous rotary motion to the blank support on an axis coinciding with the axis of the blank, means for simultaneously imparting a relative rolling movement between tool and blank about an axis intersecting the blank axis and means for maintaining the timed relation of said tool and blank movements during said last named relative motion.

57. In a machine for producing gears, a rotatable blank support, a tool support, means for positioning the tool and blank supports in operative relation, means for imparting in timed relation a reciprocatory movement in a straight line to the tool carried by said tool support and a continuous rotary motion to the blank support on an axis coinciding with the axis of the blank, means for simultaneously imparting a relative rolling movement between tool and blank in the manner of a gear rolling with a crown gear and means for maintaining the timed relation of said tool and blank movements during said last named relative motion.

58. In a machine for producing gears, a rotatable blank support, a tool support, means for positioning the tool and blank supports in operative relation, means for imparting in timed relation a reciprocatory movement to the tool in a straight line offset from the blank apex and a continuous rotary motion to the blank support on an axis coinciding with the axis of the blank, means for imparting an additional relative movement between the tool and blank and means for maintaining the timed relation of said tool and blank movements during said last named relative motion.

59. In a machine for producing gears, a rotatable blank support, a tool support, means for positioning the tool and blank supports in operative relation, means for imparting in timed relation a reciprocatory movement at a variable velocity to the tool and a continuous rotary motion to the blank support on an axis coinciding with the axis of the blank, means for imparting an additional relative movement between the tool and blank at a variable velocity and means for maintaining the timed relation of the tool and blank movements during said last named relative motion.

60. In a machine for producing gears, a rotatable blank support, a tool support, means for positioning the tool and blank supports in operative relation, means for imparting in timed relation a reciprocatory movement at a variable velocity to the tool in a straight line offset from the blank apex and a continuous rotary motion to the blank support on an axis coinciding with the axis of the blank, means for imparting an additional relative movement at a variable velocity between tool and blank and means for maintaining the timed relation of the tool and blank movements during said last named relative motion.

61. In a machine for producing gears, a rotatable blank support, a tool support, a frame, a cradle, on which one of said supports is movably mounted on the frame, means for imparting a continuous rotary motion to the blank support on an axis coinciding with the axis of the blank and in timed relation therewith a reciprocatory movement at a variable velocity to the tool, means for simultaneously imparting an oscillatory movement at a variable velocity to said cradle, compensating mechanism for maintaining the timed relation of said tool reciprocation and blank rotation during the oscillation of said cradle and mechanism for imparting a compensating movement to the cradle oscillating means during the oscillation of said cradle.

62. In a machine for producing gears, a rotatable blank support, a tool support, means for positioning the tool and blank supports in operative relation, means for imparting a reciprocatory movement at a variable velocity to the tool carried by said tool support, means for imparting a continuous rotary movement to the blank support on an axis coinciding with the axis of the blank, means for imparting an additional relative movement at a variable velocity between tool and blank, means for simultaneously imparting a relative generating movement between tool and blank and compensating means for maintaining a timed relation between the tool and blank movements during said generating movement.

63. In a machine for producing gears, a rotatable blank support, a tool support, a frame, a cradle, on which one of said supports is movably mounted on the frame, means for imparting a continuous rotary movement to the blank support on an axis coinciding with the axis of the blank, means for imparting simultaneously a reciprocatory movement to the tool at a variable velocity, means for imparting a rotary movement to the cradle and means for simultaneously imparting an oscillatory movement at a variable velocity to said cradle, compensating mechanism for maintaining the timed relation of said tool reciprocation and blank rotation during the movement of said cradle and mechanism for imparting to said cradle oscillating means a compensating movement during the movement of said cradle.

64. In a machine for producing gears, a rotatable blank support, a tool support, a frame, a cradle, on which one of said supports is movably mounted on the frame, means for imparting a continuous rotary movement to the blank support on an axis coinciding with the axis of the blank, means for reciprocating the tool at a variable velocity across the face of the blank, and means for imparting to said cradle an oscillatory movement at a variable velocity, said last named means including a member which is adjustable to vary the relation of the tool, blank, and cradle movements.

65. In a machine for producing gears, a rotatable blank support, a tool support, means for positioning the tool and blank supports in operative relation, means for imparting a continuous rotary movement to the blank support on an axis coinciding with the axis of the blank, means for reciprocating the tool at a variable velocity across the face of the blank, and means for imparting an additional relative movement between tool and blank at a variable velocity, said last named means including a member which is adjustable to vary the relation of the tool, blank, and cradle movements.

66. In a machine for producing gears, a rotatable blank support, a tool support, a frame, a cradle, on which one of said supports is movably mounted on the frame, means for imparting a continuous rotary movement to the blank support on an axis coinciding with the axis of the blank, means for reciprocating the tool at a variable velocity across the face of the blank, means for simultaneously imparting an oscillatory movement at a variable velocity to said cradle, said means comprising a shaft having a geared connection with said cradle and an actuating member adjustably connected with said shaft and capable of imparting to said shaft a reciprocatory movement at a variable velocity.

67. In a machine for producing gears, a rotatable blank support, a tool support, a frame, a cradle, on which one of said supports is movably mounted on the frame, means for imparting a continuous rotary movement to the blank support on an axis coinciding with the axis of the blank, means for reciprocating the tool at a variable velocity across the face of the blank, means for simultaneously imparting a combined rotary and oscillatory movement to said cradle, said means comprising a shaft having a geared connection with said cradle, means for rotating said shaft, and an adjustable actuating member for imparting to said shaft a reciprocatory movement at a variable velocity longitudinally of its axis.

68. In a machine for producing gears, a frame, a blank support, a tool support, means for positioning the tool and blank supports in operative relation, and means for imparting a slow relative feed movement between said tool and blank supports, comprising a carrier on which one of said supports is mounted, rotatable on said frame, a driven shaft having a geared connection with said carrier, a drive shaft, a crank disc rotatable from said drive shaft, a ratchet wheel connected to said driven shaft and a pawl connected to said crank disc and operatively engaged with said ratchet wheel.

69. In a machine for producing gears, a tool, a frame, gear and pinion carriers mounted on said frame, means for adjusting each of said carriers to move the same into operative position, a blank spindle rotatably mounted on each of said carriers, a single drive shaft, and means carried by each of said carriers for detachably connecting said drive shaft in driving relation with either of said blank spindles.

70. In a machine for producing gears, a tool, a frame, gear and pinion carriers mountable on said frame, means for adjusting each of said carriers on said frame to move the same into operative position, a blank spindle rotatably mounted on each of said carriers, means for imparting to either of said blank spindles movement in either direction, comprising a bracket swivelly mounted on each of said carriers, a gear journalled in each of said brackets and having a driving connection with its respective spindle and a single drive shaft capable of being detachably connected to either of said gears.

71. In a machine for producing gears, a frame, a tool support, a blank support, a cradle, on which one of said supports is movably mounted on said frame, means for positioning the tool and blank supports in operative relation, means for moving the tool across the face of the blank, means for imparting a rotary movement to the blank support, drive means adapted to move said cradle on its axis in either direction at one speed, drive means adapted to move said cradle on its axis in either direction at a different speed, and means for operatively connecting either of said drive means with said cradle.

72. In a machine for producing gears, a tool, a blank support, means for imparting to one of said bodies movement at different velocities in either direction, said means comprising a shaft, a gear journalled on said shaft and rotatable at one speed, a second gear journalled on said shaft and rotatable at a different speed, means for connecting either of said gears to said shaft, and means preventing connection of one of said gears to said shaft while the other is connected thereto.

73. In a machine for producing gears, a frame, a tool support, a blank support, a cradle, on which one of said supports is mounted on said frame for movement on an axis intersecting the axis of the blank support, means for moving the tool across the face of the blank means for imparting rotary movement to the blank support, means for simultaneously moving the cradle on its axis, means for imparting a relative feed movement between said supports toward each other at one speed, and means for imparting a relative feed movement between said supports toward and from each other at a different speed.

74. In a machine for producing gears, a driven shaft, a pair of gears operating at different speeds rotatably mounted on said shaft, separate clutches each operatively connected with said shaft and mounted on said shaft for engagement with one of said gears, an arm rigidly connected to one of said clutches adapted to prevent engagement of the other clutch with its gear when the first clutch is in engagement with its gear, said arm being provided with a recess and means on the other clutch adapted to engage in said recess on engagement of said other clutch with its gear to prevent movement of the first clutch.

75. In a machine for producing gears, a blank support, a tool support, a frame, a carrier, on which one of said supports is movably mounted on the frame, means for moving the tool carried by said tool support across the face of the blank, means for imparting to the blank support a continuous rotary movement on an axis coinciding with the axis of the blank, drive means for imparting to said carrier simultaneously with the tool and blank movements a movement in either direction at one speed, drive means for imparting to said carrier simultaneously with the tool and blank movements a movement in either direction at a different speed, and means for operatively connecting each of said drive means to said carrier.

76. In a machine for producing gears, a blank support, a tool support, a frame, a carrier, on which one of said supports is movably mounted on the frame, means for moving the tool carried by said tool support across the face of the blank, means for imparting to the blank support a rotary movement on an axis coinciding with the axis of the blank, drive means for imparting to said carrier simultaneously with the tool and blank movements a movement in either direction at one speed, and drive means for imparting to said carrier simultaneously with the tool and blank movements a movement in either direction at a different speed, means for connecting each of said drive means to said carrier, and means for preventing connection of one of said drive means with said carrier while the other is in driving connection therewith.

77. In a machine for producing gears, a blank support, a tool support, a frame, a cradle on which one of said supports is mounted on the frame for movement on an axis intersecting the axis of the blank support, means for moving the tool carried by said tool support across the face of the blank, means for imparting to the blank support a rotary motion on an axis coinciding with the axis of the blank, means for imparting to said cradle a movement in either direction at one speed, means for imparting to said cradle a movement in either direction at a different speed and compensating means for maintaining a timed relation between the tool and blank movements during the movement of said carrier in either direction at either speed.

78. In a machine for producing gears, a blank support, a tool support, a frame, a cradle on which one of said supports is mounted on the frame, for movement on an axis intersecting the axis of the blank support, means for moving the tool carried by said tool support across the face of the blank, means for imparting to the blank support a rotary motion on an axis coinciding with the axis of the blank, means for imparting to said cradle movement in either direction at one speed, means for imparting to said cradle movement in either direction at a different speed, compensating means for maintaining a timed relation between the tool and blank movements during the movement of said cradle in either direction at either speed and means for moving said cradle independently of said drive and compensating means to adjust the cradle and support carried thereby relatively to the other support.

79. In a machine for producing gears, a frame, a blank carrier pivotally mounted on said frame, and provided with a bearing concentric of its pivot, a second blank carrier detachably mountable on said frame for pivotal movement in the bearing provided in the first carrier, and separate means carried by each of said carriers for adjusting the same on said frame.

80. In a machine for producing gears, a frame, a tool support, a blank support, one of said supports being angularly movable on said frame toward and from the other support about an axis passing through the apex or blank carried by blank support, means for moving said support toward the other support at one speed and means for moving said support toward and from the other support at a different speed.

ALLAN H. CANDEE.
MAGNUS H. JOHANSON.